(12) United States Patent
Tiwari et al.

(10) Patent No.: US 11,985,180 B2
(45) Date of Patent: May 14, 2024

(54) MEETING-VIDEO MANAGEMENT ENGINE FOR A MEETING-VIDEO MANAGEMENT SYSTEM

(71) Applicant: MICROSOFT TECHNOLOGY LICENSING, LLC, Redmond, WA (US)

(72) Inventors: Nidhi Tiwari, Bangalore (IN); Chao Han, Vancouver (CA); Krish Gurdasani, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 228 days.

(21) Appl. No.: 17/527,641

(22) Filed: Nov. 16, 2021

(65) Prior Publication Data

US 2023/0156063 A1 May 18, 2023

(51) Int. Cl.
*H04L 65/403* (2022.01)
*G06F 16/71* (2019.01)
(Continued)

(52) U.S. Cl.
CPC .............. *H04L 65/75* (2022.05); *G06F 16/71* (2019.01); *G06F 18/214* (2023.01); *G06N 20/00* (2019.01);
(Continued)

(58) Field of Classification Search
CPC .... G06V 20/46; G06V 20/49; H04L 12/1831; H04L 65/75; H04L 65/403;
(Continued)

(56) References Cited

U.S. PATENT DOCUMENTS 6,430,582 B1 8/2002 Duncombe
6,738,078 B1 5/2004 Duncombe
(Continued)

OTHER PUBLICATIONS

"Athenascope", Retrieved from: https://web.archive.org/web/20210906114639/https://athenascope.com/, Sep. 6, 2021, 7 Pages.
(Continued)

*Primary Examiner* — Melur Ramakrishnaiah
(74) *Attorney, Agent, or Firm* — Shook, Hardy & Bacon L.L.P.

(57) ABSTRACT

Methods, systems, and computer storage media for providing a tailored meeting-video segment associated with a meeting-video management engine of a meeting-video management system. The tailored meeting-video segment corresponds to a portion of meeting-video content that is programmatically generated based on features associated with video data, meeting data, and user data. A tailored meeting-video segment—or a plurality of tailored meeting-video segments—can be generated by employing a meeting-video tailoring machine learning model of the meeting-video management engine. In particular, the features—associated with video data comprising the plurality of clips, meeting data of the meeting, and user data of the user—are meeting-video tailoring features used by the meeting-video tailoring machine learning model to generate the tailored meeting-video segment. The tailored meeting-video segment is communicated to a user to enable uniquely tailored presentation and playback of meeting-video content computed to be relevant to the user via the meeting-video management engine.

20 Claims, 20 Drawing Sheets

(51) Int. Cl.
| | |
|---|---|
| *G06F 18/214* | (2023.01) |
| *G06N 20/00* | (2019.01) |
| *G06V 20/40* | (2022.01) |
| *G10L 25/57* | (2013.01) |
| *H04L 65/75* | (2022.01) |

(52) U.S. Cl.
CPC .............. *G06V 20/46* (2022.01); *G06V 20/49* (2022.01); *G10L 25/57* (2013.01); *H04L 65/403* (2013.01)

(58) Field of Classification Search
CPC .. H04L 12/1827; G06N 20/00; G06N 3/0464; G06N 3/0442; G06F 16/71; G06F 18/214; H04N 7/15; H04N 7/147; H04N 7/155
USPC ............................................. 348/14.01–14.16
See application file for complete search history.

(56) References Cited

U.S. PATENT DOCUMENTS

| | | | |
|---|---|---|---|
| 6,792,573 | B1 | 9/2004 | Duncombe |
| 8,316,315 | B2 | 11/2012 | Portnoy et al. |
| 2019/0215482 | A1* | 7/2019 | Sathya ...................... H04N 7/15 |
| 2021/0321163 | A1* | 10/2021 | Ramos ................... G06N 20/00 |
| 2021/0397824 | A1* | 12/2021 | Mishra ................... G06N 3/044 |
| 2022/0385858 | A1* | 12/2022 | Oluyemi ................ G06V 10/70 |

OTHER PUBLICATIONS

"Otter", Retrieved from: https://get.otter.ai/zoom/, Retrieved Date: Mar. 30, 2021, 5 Pages.
"Vidovation", Retrieved from: https://web.archive.org/web/20180218055646/https://www.vidovation.com/automatically-create-highlight-reels-edit-video/, Feb. 18, 2018, 6 pages.
Chalk, Andy, "This tech uses AI to automatically create highlight clips for you in Fortnite and PUBG", Retrieved from: https://web.archive.org/web/20190217145857/https://www.pcgamer.com/this-tech-uses-ai-to-automatically-create-highlight-clips-for-you-in-fortnite-and-pubg/, Feb. 15, 2019, 11 Pages.
Kushwaha, Naveen, "8 Best Free Video Highlight Maker Software For Windows", Retrieved from: https://web.archive.org/web/20200927042702/https://listoffreeware.com/free-video-highlight-maker-software-windows/, Sep. 27, 2020, 14 Pages.
Pai, Aravind, "Become a Video Analysis Expert: A Simple Approach to Automatically Generating Highlights using Python", Retrieved from: https://www.analyticsvidhya.com/blog/2019/09/guide-automatic-highlight-generation-python-without-machine-learning/, Sep. 9, 2019, 10 Pages.
Prince, Glenn, "Custom Model Object Detection with OpenCV and ImageAI", Retrieved from: https://www.codeproject.com/Articles/5270246/Custom-Model-Object-Detection-with-OpenCV-and-Imag, Jun. 11, 2020, 6 pages.
Wagner, Benjamin, "Using OpenCV to detect face key points in C++", Retrieved from: https://medium.com/analytics-vidhya/using-opencv-to-detect-face-key-points-with-c-f77d50e59685, Aug. 8, 2020, 6 pages.
"Overview—TAO Toolkit 3.0 documentation", Retrieved from: https://docs.nvidia.com/tao/tao-toolkit/text/overview.html, Retrieved Date: Mar. 30, 2021, 9 Pages.
Wiggers, Kyle, "Zoom rolls out AI-powered transcripts, note-taking features, and more", Retrieved from: https://venturebeat.com/2019/10/15/zoom-rolls-out-ai-powered-transcripts-note-taking-features-and-more/, Oct. 15, 2019, 6 pages.
Ji, et al., "NBA Basketball Video Summarization for News Report via Hierarchical-Grained Deep Reinforcement Learning", In Proceedings of International Conference on Image and Graphics, Sep. 30, 2021, pp. 712-728.
Potapov, et al., "Category-Specific Video Summarization", In Proceedings of European Conference on Computer Vision, Dec. 31, 2014, pp. 540-555.
"International Search Report and Written Opinion Issued in PCT Application No. PCT/US22/042284", dated Dec. 15, 2022, 14 Pages.

* cited by examiner

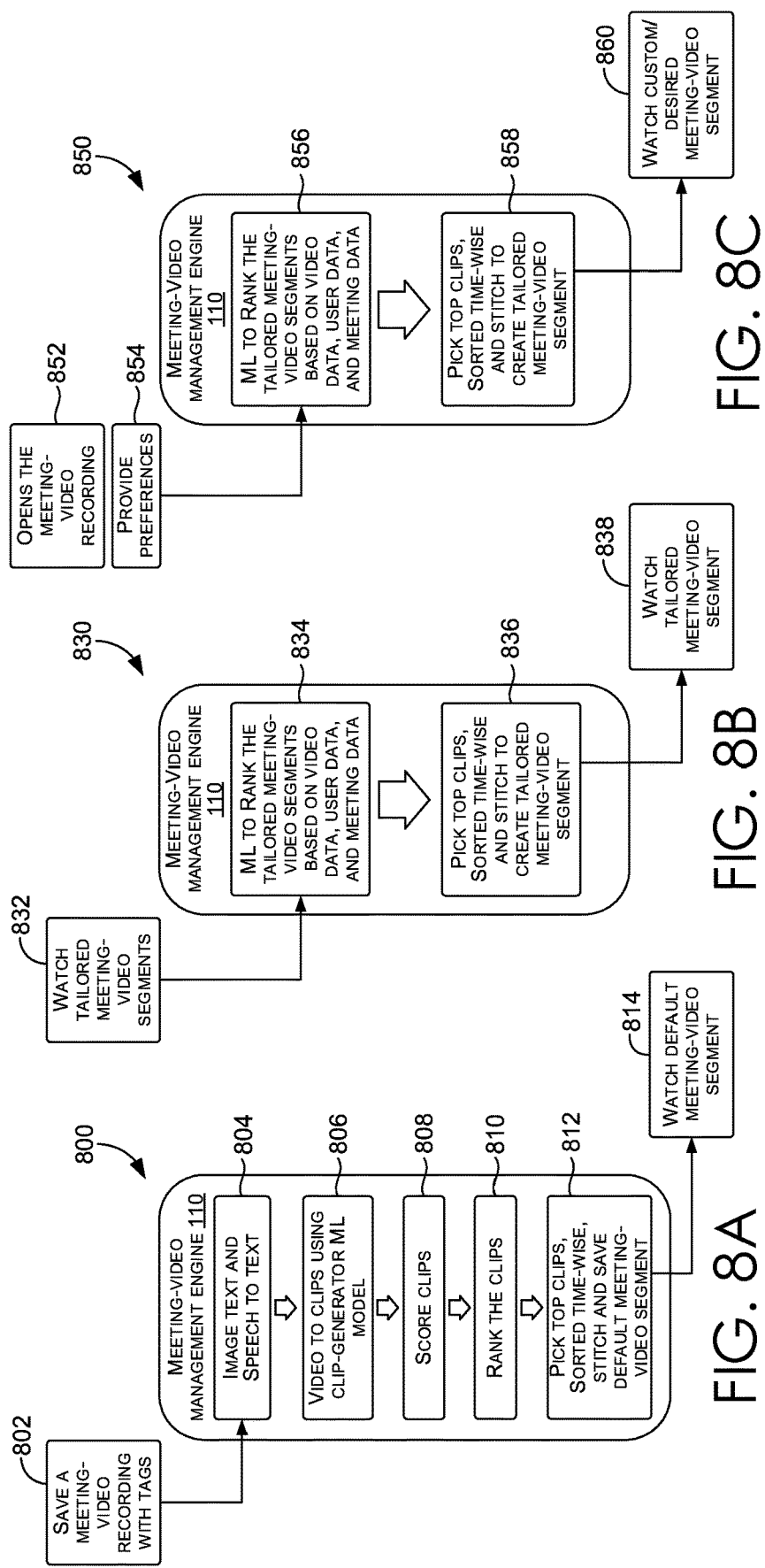

MEETING-VIDEO MANAGEMENT ENGINE FOR A MEETING-VIDEO MANAGEMENT SYSTEM

BACKGROUND

Users rely on applications and services to facilitate access to different types of video content. Distributed computing systems (e.g., cloud computing platforms) host video management systems that support networked access to video content. A meeting-video management system can be part of a video management system in a distributed computing system that provides different types of productivity tools from word processing to task management. The meeting-video management system can operate as part of the video management system to provide live and on-demand meeting-videos in association with the different types of productivity tools. In particular, the meeting-video management system performs computing tasks to facilitate meetings. For example, meeting-video management systems support meeting-video calls and supporting meeting operations including secured user access, meeting hosting, recording, and distributing meeting content.

Conventionally, meeting-video management systems are not configured with a computing infrastructure or logic to deliver uniquely tailored meeting-video segments. In particular, conventional meeting-video management systems present meeting-video content as full recordings that include irrelevant superfluous video content. Full recordings increase computing resource burden in that users perform additional video review and playback operations when trying to identify relevant video content. As such, a more comprehensive meeting-video management system—with an alternative basis for performing meeting-video management operations—can improve computing operations and interfaces in meeting-video management systems.

SUMMARY

Various aspects of the technology described herein are generally directed to systems, methods, and computer storage media, for among other things, providing a tailored meeting-video segment associated with a meeting-video management engine of a meeting-video management system. The tailored meeting-video segment—also known as either of the following: a meeting highlight, highlight segment, subset of the meeting-video content, or tailored meeting highlight—corresponds to a portion of meeting-video content that is programmatically generated based on features associated with video data, meeting data, and user data. First, a plurality of clips of the meeting-video content—associated with a meeting and a user—are generated using a clip-generator machine learning model of the meeting-video management engine. Then, the tailored meeting-video segment—or a plurality of tailored meeting-video segments—can be generated by employing a meeting-video tailoring machine learning model of the meeting-video management engine. In particular, the features—associated with (1) video data comprising the plurality of clips, (2) meeting data of the meeting, and (3) user data of the user—are meeting-video tailoring features used by the meeting-video tailoring machine learning model to generate the tailored meeting-video segment. The tailored meeting-video segment is communicated to a user to enable uniquely tailored playback of content computed to be relevant to the user.

Conventionally, meeting-video management systems are not configured with a computing infrastructure or logic to deliver uniquely tailored meeting-video segments. A technical solution—to the limitations of conventional meeting-video management system operations—provides tailored meeting-video segments via a meeting-video management engine of a meeting-video management system. In operation, the meeting-video management engine accesses meeting-video content associated with a meeting associated with a user. For example, the meeting-video content may include video data, meeting data, and user data. The video data may be derived from a first clip and a second clip generated via the clip-generator machine learning model. The video data, the meeting data, and the user data are associated with meeting-video tailoring features of a meeting-video tailoring machine learning model that is trained to generate tailored meeting-video segments. Based on the video data, the meeting data, and the user data, the meeting-video management engine generates a first tailored meeting-video segment and a second tailored meeting-video segment that are ranked with respect to one another. The meeting-video management engine communicates the ranked first tailored meeting-video segment and second tailored meeting-video segment.

In addition, in some embodiments, a client device associated with a user communicates a request for meeting-video content corresponding to a conference associated with a first meeting and a second meeting. Based on the request, the client device receives the tailored meeting-video segments from the meeting-video management engine. The tailored meeting-video segments are generated based on the video data, the meeting data associated with the first meeting and the second meeting, and the user data. The client device causes presentation of a meeting-video graphical user interface element that controls playback of the plurality of tailored meeting-video segment.

Moreover, in some embodiments, the meeting-video management engine includes (1) a clip-generator machine learning model and (2) a meeting-video tailoring machine learning model. First, the clip-generator machine learning model is trained based on meeting features corresponding to the video data. The clip-generator machine learning model is configured to generate at least one clip, such that the first tailored meeting-video segment includes the at least one clip. Second, the meeting-video tailoring machine learning model is trained based on meeting-video tailoring features. The meeting-video tailoring features correspond to the video data, the meeting data, and the user data. The meeting-video tailoring features represent machine learning metrics relating the meeting content, the video content, and the user. Operationally, the clip-generator machine learning model is first used to programmatically define the video data. And the meeting-video machine learning model accesses the video data comprising the plurality of clips, the meeting data, and the user data to generate the plurality of tailored meeting-video segments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIG. 8A provides an exemplary method of providing meeting-video management clients with a default meeting-video segment using a meeting-video management engine in a meeting-video management system, in accordance with aspects of the technology described herein;

FIG. 8B provides an exemplary method of providing meeting-video management clients with a tailored meeting-video segment using a meeting-video management engine in a meeting-video management system, in accordance with aspects of the technology described herein;

FIG. 8C provides an exemplary method of providing meeting-video management clients with a custom meeting-video segment using a meeting-video management engine in a meeting-video management system, in accordance with aspects of the technology described herein;

DETAILED DESCRIPTION OF THE INVENTION

Figure 1A:
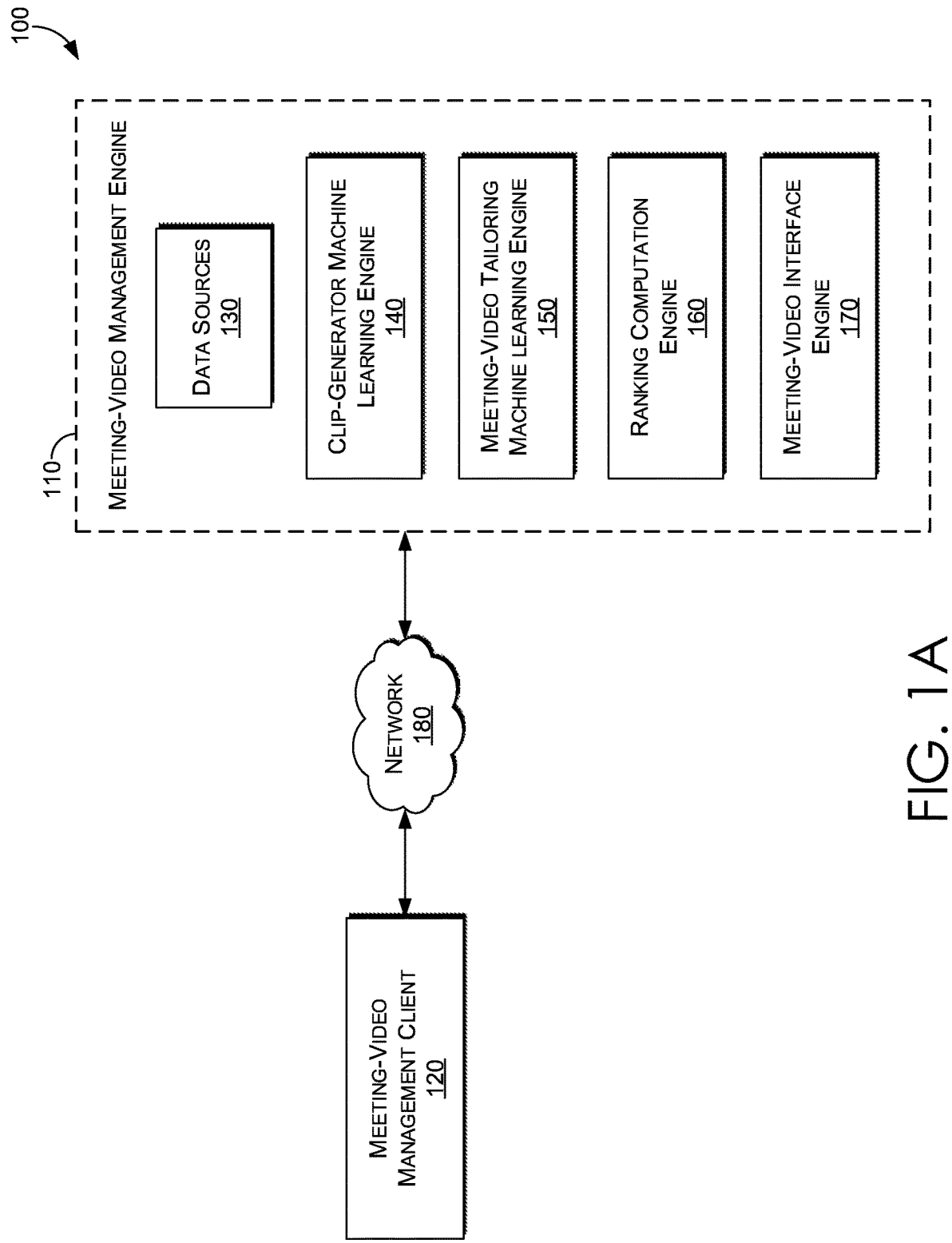
FIG. 1A is a block diagram of an exemplary meeting-video management system for providing tailored meeting-video segments using a meeting-video management engine of the meeting-video management system, in accordance with aspects of the technology described herein.

Overview of Technical Problems, Technical Solutions, and Technological Improvements Meeting-video management systems operate within a content management system to provide teleconferencing, telecommuting, distance education, and social relations services. In particular, a meeting-video management system can be part of a video management system in a distributed computing system that provides different types of productivity tools from word processing to task management. The meeting-video management system performs computing tasks to facilitate meetings. For example, meeting-video management systems support meeting-video calls and support meeting operations including secured user access, meeting hosting, recording, and distributing meeting content.

Conventionally, meeting-video management systems are not configured with a computing infrastructure or logic to deliver uniquely tailored meeting-video segments. For example, conventional meeting-video management system do not facilitate finding the portions of meeting-video content—that would be most relevant to a user—in an efficient way. Conventional meeting-video management systems present meeting-video content as full recordings that include irrelevant superfluous meeting-video content. Full recordings increase computing resource burden in that users perform additional video review and playback operations when trying to identify relevant video content. In particular, full recordings further cause additional user queries to the meeting-video management system to locate the most relevant portions of video. Retrieving meeting content in this manner triggers operations that cause additional inefficient manual computations by the user via the meeting-video management system to identify the portions of meeting-video content that are relevant to the user. As such, a more comprehensive meeting-video management system—with an alternative basis for performing meeting-video management operations—can improve computing operations and interfaces in meeting-video management systems.

As used herein, "meeting" may refer to any suitable scheduled or unscheduled event or gathering. For example, meeting-video content may be accessible as on-demand content configured for playback at any suitable time, for example, independent of a scheduled event or gathering. Example meeting-video content may include training content, tradeshow content, advertising content, and the like. Moreover, a conference may be delivered digitally as one or more meeting-video contents, such as a series of episodes, classes, webinars, and the like.

Embodiments of the present disclosure are directed to providing a tailored meeting-video segment associated with a meeting-video management engine of a meeting-video management system. The tailored meeting-video segment—also known as either of the following: a meeting highlight, highlight segment, subset of the meeting-video content, or tailored meeting highlight—corresponds to a portion of meeting-video content that is programmatically generated based on features associated with video data, meeting data, and user data. First, a plurality of clips of the meeting-video content—associated with a meeting and a user—are generated using a clip-generator machine learning model of the meeting-video management engine. Then, the tailored meeting-video segment—or a plurality of tailored meeting-video segments—can be generated by employing a meeting-video tailoring machine learning model of the meeting-video management engine. In particular, the features—associated with (1) video data comprising the plurality of clips, (2) meeting data of the meeting, and (3) user data of the user—are meeting-video tailoring features used by the meeting-video tailoring machine learning model to generate the tailored meeting-video segment. The tailored meeting-video segment is communicated to a user to enable uniquely tailored playback of content computed to be relevant to the user.

By way of example, in response to accessing meeting-video content, such as a video and associated data of a speech delivered by John Smith at a conference, a tailored meeting-video segment may be determined to be the portion of the speech starting at 2 minutes and ending at 3 minutes and 45 seconds. The tailored meeting-video segment may correspond to a specific topic (e.g., covering the mixed-reality headset—HoloLens) and may be generated based on video data (e.g., clips of the speech, such that the clips include portions of the speech covering the structure of the mixed-reality headset), meeting data (e.g., that John Smith is the keynote speaker of the conference on virtual reality), and user data (e.g., that the user is a project manager in the department responsible for the HoloLens). A meeting-video tailoring machine learning model may be trained to determine the tailored meeting-video segment. The tailored meeting-video segment (i.e., the portion of John Smith's speech, starting at 2 minutes and ending at 3 minutes and 45 seconds, covering the structure of the mixed-reality headset, in this example) is one tailored meeting-video segment that corresponds to a portion of the meeting-video content (i.e., the entire speech given by John Smith and the associated data of the speech, in this example).

Moreover, as set forth in the example above, if the client device is associated with a project manager of a particular mixed-reality headset, the meeting-video management engine may communicate a tailored meeting-video segment corresponding to the portion of John Smith's speech covering the structure of the mixed-reality headset. This tailored meeting-video segment may correspond to at least one clip (of the entire video) determined to be relevant to user (e.g., the project manager in this example). In this way, the meeting-video management engine addresses limitations in conventional meeting-video management systems that fail to adequately address the generation of uniquely tailored meeting-video content (e.g., since entire videos may include different content of which only a subset may be relevant to a particular user ID). Advantageously, the meeting-video management engine operates in a manner that reduces computational resource utilization associated with streaming, while reducing the volume of meeting-video content that is delivered to meeting attendees. While the illustrated embodiments below are discussed in the context of meeting-video content, it should be appreciated that the disclosed embodiments may be implemented in any other or additional digital context, such as generated graphics, still images, audio content, alone or in any combination, or any other suitable digital content.

Figure 1B:
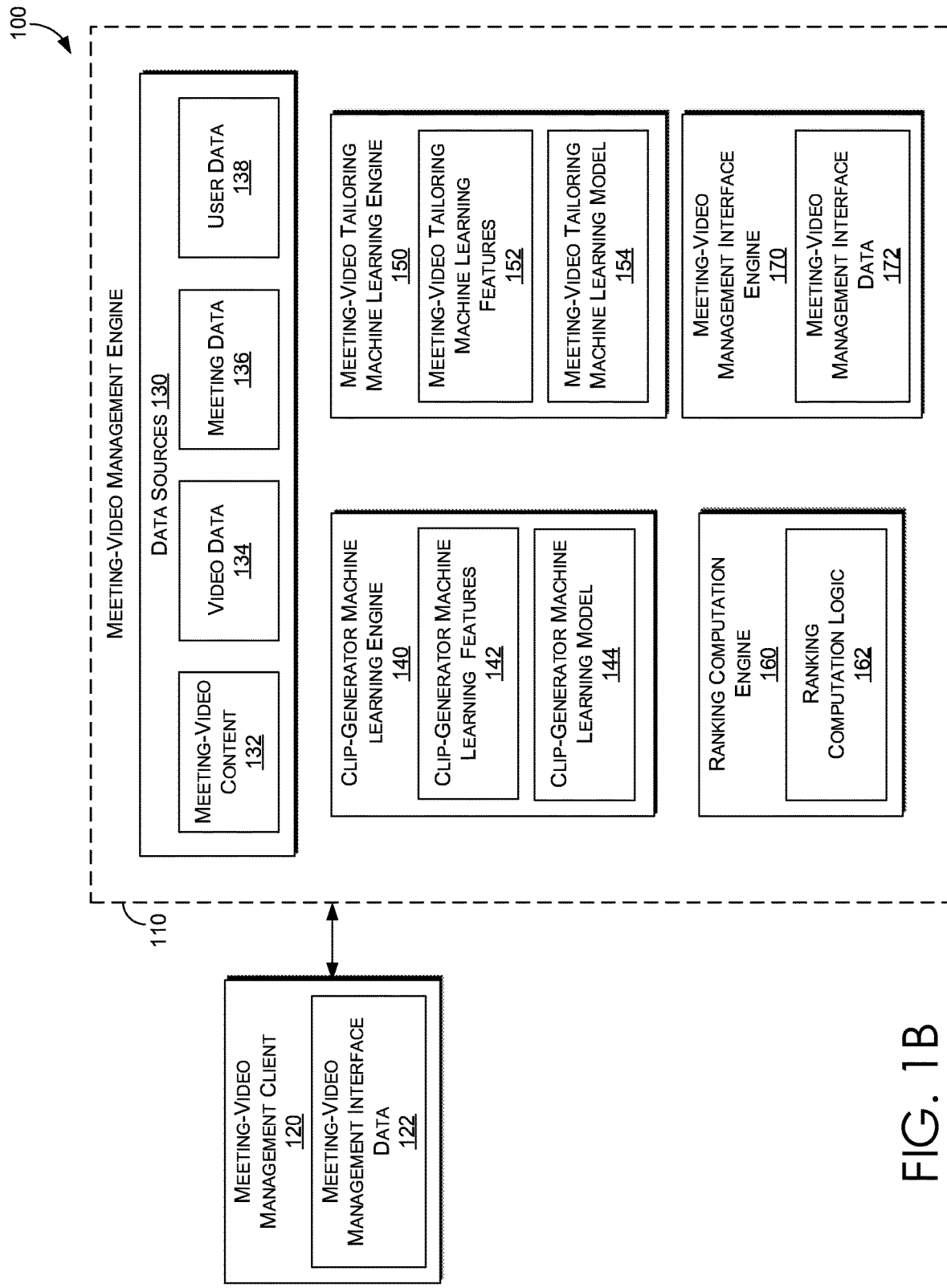
FIG. 1B is a block diagram of an exemplary schematic for providing tailored meeting-video segments using a meeting-video management engine in a meeting-video management system, in accordance with aspects of the technology described herein.
Figure 1C:
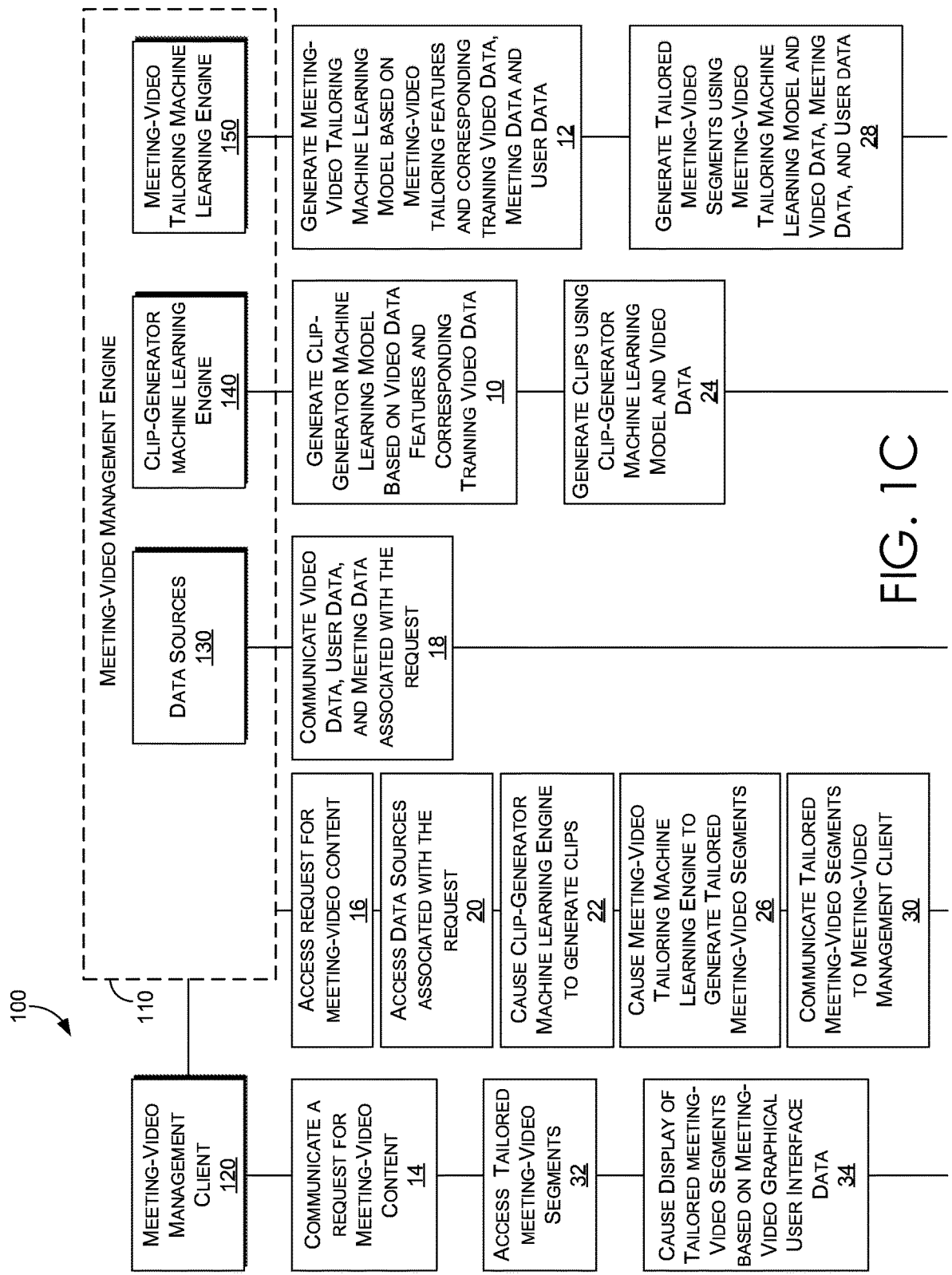
FIG. 1C is an exemplary meeting-video management system based on tailored meeting-video segments of a meeting-video management system, in accordance with aspects of the technology described herein.

Aspects of the technical solution can be described by way of examples and with reference to FIG. 1A, FIGS. 1B, and 1C. FIG. 1A illustrates a meeting-video management system 100 having a meeting-video management engine 110, a meeting-video management client 120, and network 180. The meeting-video management engine includes data sources 130, clip-generator machine learning engine 140, meeting-video tailoring machine learning engine 150, ranking computation engine 160, and meeting-video management interface engine 170.

With reference to FIG. 1B, FIG. 1B includes an exemplary meeting-video management system 100 for providing tailored meeting-video segments to a plurality of meeting-video management clients using a meeting-video management engine in the meeting-video management system, in accordance with aspects of the technology described herein. FIG. 1B includes components that correspond to components described with reference to FIG. 1A. The meeting-video management system 100 further includes meeting-video management client 120 having meeting-video interface data 122; data sources 130 having meeting-video content 132, video data 143, meeting data 136, user data 138; the clip-generator machine learning engine 140 having clip-generator machine learning features 142 and clip-generator machine learning model 144; meeting-video tailoring machine learning engine 150 having meeting-video tailoring machine learning features 152 and meeting-video tailoring machine learning model 154; ranking computation engine having ranking computation logic 162; and meeting-video management interface engine 170 having meeting-video management interface data 172. The clip-generator machine learning features 142 may correspond to the video data features and/or meeting data features.

The meeting-video management system 100 that is configured to provide tailored meeting-video segments using the meeting-video management engine 110. The meeting-video management system includes the meeting-video management engine 110 that operates with management engine clients (e.g., meeting-video management engine client 120) and manages meeting-video content and meeting-video interfaces to provide the functionality described herein. The meeting-video management engine clients include client-side computing logic and instructions that complement and supplement the server-side computing logic and instructions of the meeting-video management engine 110 for providing the tailored meeting-video segments. For example, the meeting-video management system 100 can perform operations based on machine learning models (e.g., clip-generator machine learning model or meeting-video tailoring machine learning model) and provide interfaces for accessing, communicating, and generating interfaces (i.e., meeting-video graphical user interface elements) associated with the tailored meeting-video segments as described herein.

Meeting-video content 132, video data 134, meeting data 136, and user data 138 can be stored and retrieved via data sources (e.g., data sources 130) of the meeting-video management system 100 and can include data that support providing the services associated with a meeting-video management system 100. For example, a meeting-video management system can support recording meeting-video content 132 as video (i.e., video data 134), where the meeting-video management system 100 is enabled to manage meeting-video content 132. Additional data (e.g., metadata) associated with the meeting-video content 132 can be tracked and stored.

With reference to FIG. 1C includes an exemplary meeting-video management system 100 for providing tailored meeting-video segments to a plurality of meeting-video management clients using a meeting-video management engine in the meeting-video management system, in accordance with aspects of the technology described herein. FIG. 1C includes components that correspond to components described with reference to FIG. 1B. FIG. 1C includes meeting-video management client 120 and meeting-video management engine 110 having data sources 130, clip-generator machine learning model engine 104, and meeting-video tailoring machine learning engine 150.

Operationally, at block 10, the clip-generator machine learning engine generates a clip-generator machine learning model based on video data feature(s) and corresponding training video data. At block 12, the meeting-video tailoring machine learning engine generates a meeting-video tailoring machine learning model based on meeting-video tailoring features and corresponding training video data, user data, and meeting data.

At block 14, the meeting-video management client 120 communicates a request for meeting-video content. At block 16, the meeting-video management engine 110 accesses the request for the meeting-video content; at block 20, accesses data sources associated with the request; and at block 22, causes the clip-generator machine learning engine 140 to generate clips. At block 24, the clip-generator machine learning engine 140 generates clips, for example, using the clip-generator machine learning model and video data. At block 26, the meeting-video management engine 110, causes the meeting-video tailoring machine learning engine 150 to generate tailored meeting-video segments; and at block 28, the meeting-video tailoring machine learning engine 150 generates tailored meeting-video segments using a meeting-video tailoring machine learning model and video data, meeting data, and user data.

At block 30, the meeting-video management engine communicates the tailored meeting-video segments to the meeting-video management client 120. At block 32, the meeting-video management client 120 accesses the tailored meeting-video segments, and at block 34, causes display of the tailored meeting-video segments based on meeting-video graphical user interface data. Other variations and combinations for providing the tailored meeting-video segments are contemplated with embodiments described herein.

Figure 2A:
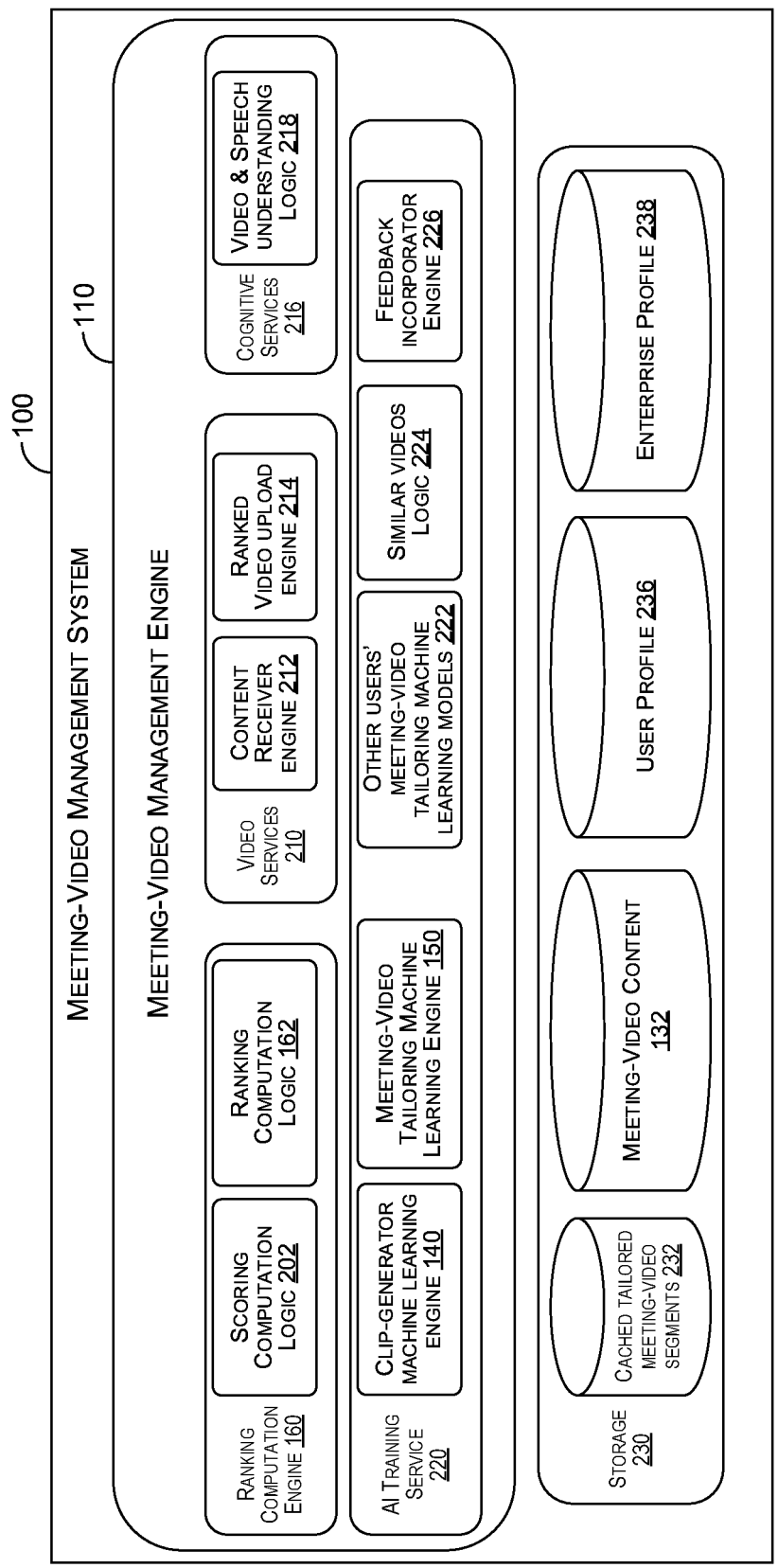
FIG. 2A is an exemplary meeting-video management system for providing tailored meeting-video segments using a meeting-video management engine in the meeting-video management system, in accordance with aspects of the technology described herein.
Figure 2B:
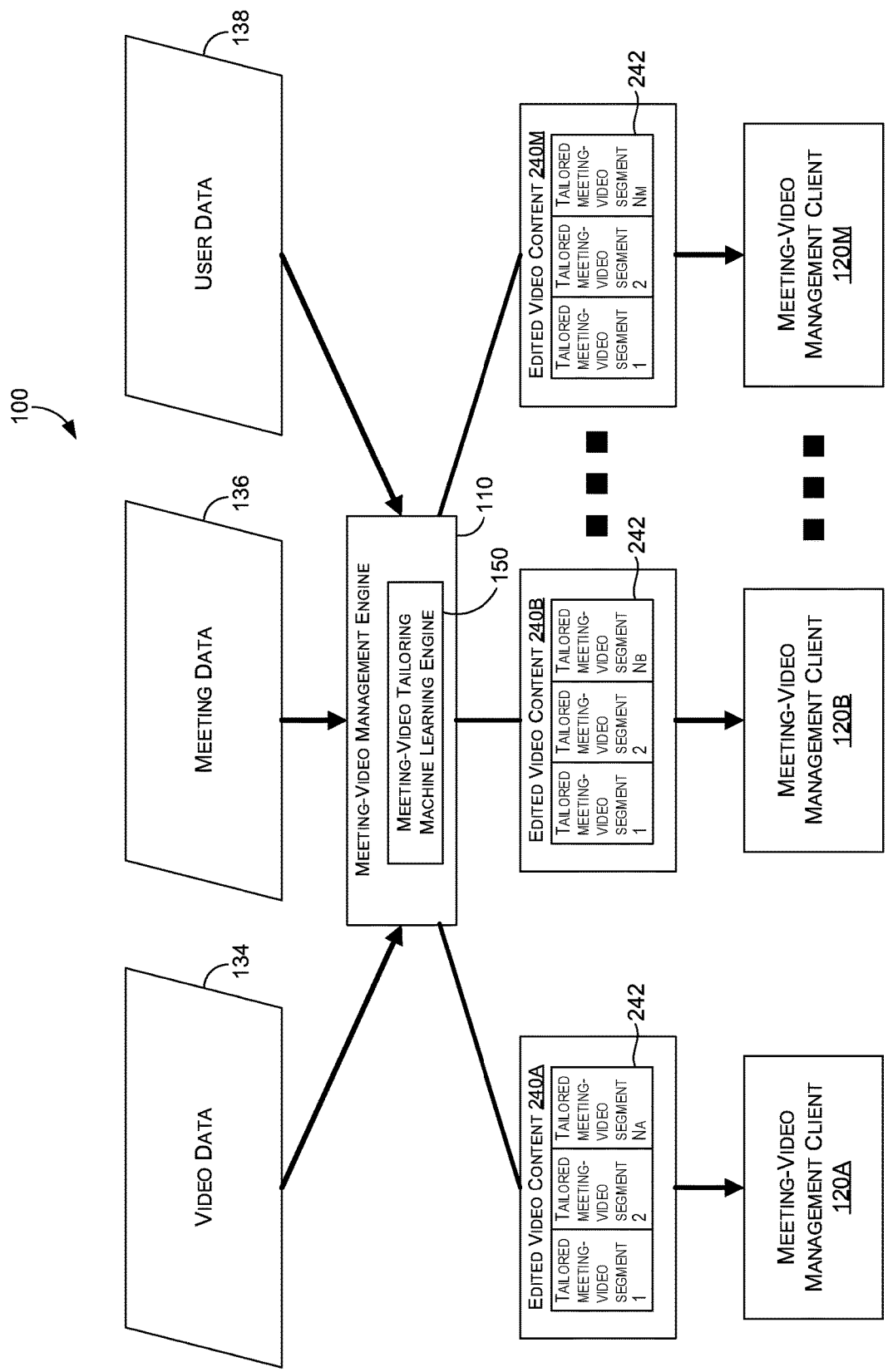
FIG. 2B is an exemplary meeting-video management system for providing tailored meeting-video segments to a plurality of meeting-video management clients using a meeting-video management engine in the meeting-video management system, in accordance with aspects of the technology described herein.

Overview of Exemplary Environments for Providing Tailored Meeting-Video Segments Using a Meeting-Video Management Engine in a Meeting-Video Management System Aspects of the technical solution can be described by way of examples and with reference to FIGS. 2A, 2B and 2C. FIG. 2A is a block diagram of an exemplary technical solution environment, based on example environments described with reference to FIGS. 13 and 14 for use in implementing embodiments of the technical solution are shown. Generally the technical solution environment includes a technical solution system suitable for providing the example meeting-video management system 100 in which methods of the present disclosure may be employed. In particular, FIG. 2A shows a high level architecture of the meeting-video management system 100 in accordance with implementations of the present disclosure.

Among other engines, managers, generators, selectors, or components not shown (collectively referred to herein as "components"), the technical solution environment of meeting-video management system 100 includes meeting-video management engine 110. The meeting-video management engine 110 includes the ranking computation engine 160, which includes scoring computation logic 202 and the ranking computation logic 162. The meeting-video management engine 110 includes video services 210, which includes a content receiver engine 212 and a ranked video upload engine 214. The meeting-video management engine 110 includes cognitive service 216, which include video and speech understanding logic 218. The meeting-video management engine 110 includes an artificial intelligence (AI) training service 220, which includes the clip-generator machine learning engine 140, the meeting-video tailoring machine learning engine 150, other users' meeting-video tailoring machine learning models 222, similar videos logic 224, and feedback incorporator engine 226. The storage 230 includes the cached tailored meeting-video segments 232, meeting-video content 234, user profiles 236, and enterprise profile 238.

The user profiles 236 includes data indicative of preferences specific to a particular user. The data indicative of the user preferences may be automatically collected, for example, based on a user interacting with a software application, web page, and the like. The data indicative of the user preferences may be captured using first-party cookies, third-party cookies, randomly generated identifications, and the like. In some embodiments, the user profile 236 may include user interaction data, event-based interactions of a user with specific software applications, and the like. For example, the user profile 236 may include user interactions with video players, downloads, music, E-mail applications, and the like.

The enterprise profile 238 may include role-specific data indicative of preferences specific to users of a particular role or belonging to a particular department within an organization. The role-specific data may be automatically collected, for example, based on a user (having the particular role or belonging to a particular department) interacting with a software application, web page, and the like. The data accumulated for the users having the particular role may be associated to the role and statistical analysis may be performed on the accumulated data to normalize the data and generate the enterprise profile 238.

The feedback incorporator engine 226 may be used to refine the user profile 236, the enterprise profile, or both. The feedback incorporator engine 226 may push periodic surveys to client devices for the respective users (e.g., the meeting-video management client 120 of FIG. 1). The respective users may complete a survey concerning their satisfaction with the tailored meeting-video segment that the meeting-video management engine 110 communicated to the respective user. For example, the meeting-video management engine 110 may communicate the survey at the same time or at a later time that the meeting-video management engine 110 communicated the tailored meeting-video segment. The survey may include a multiple-choice survey, a customer satisfaction survey, a binary survey (e.g., thumbs up to indicate satisfaction and thumbs down to indicate dissatisfaction), or any suitable mechanism for receiving feedback on whether the user is satisfied with the tailored meeting-video segment. In some embodiments, the feedback incorporator engine 226 may be used to refine the clip-generator machine learning engine 140, the meeting-video tailoring machine learning engine 150, ranking computation engine 160, and the like.

The video services 210 may include a content receiver engine 212. The content receiver engine 212 may receive videos (e.g., meeting-videos) from a provider. The content receiver engine 212 may receive the videos from the provider and communicate the videos to the AI training services. The videos received from the provider may include an MPEG-4 Part 14 (MP4) file, a MOV file, a QuickTime File Format (QTFF) file, a WMV file, an AVI file, an Advanced Video Coding High Definition (AVCHD) file, a WebM file, MKV file, or any other suitable video formatted file. In some embodiments, the content receiver engine 212 records the provider who sent the video and the creator who created the video. The content receiver engine 212 may associate the provider and the creator to the video (e.g., as metadata). For example, the content receiver engine 212 may receive a video from a provider responsible for hosting a conference that was created by an enterprise. In this example, the content receiver engine 212 may associate the provider (as the provider) and the enterprise (as the creator).

The content receiver engine 212 may extract any suitable metadata from the videos it receives. For example, the content receiver engine 212 may extract, for a video, video data corresponding to video data features, user data corresponding to user data features, and meeting data corresponding to meeting data features respectively used to train the meeting-video tailoring machine learning model 154 (FIG. 1B). In some embodiments, the content receiver engine 212 may store the video, the corresponding video data, the corresponding meeting data, the corresponding user data (of the user to whom the video was intended to be sent) in the storage 230.

The content receiver engine 212 may receive a video, which, along with its data may be stored in the storage 230 (e.g., as meeting-video content). Additionally or alternatively, the storage 230 may store cached tailored meeting-video segments 232. The cached tailored meeting-video segments 232 may be stored in storage 230 for later use. For example, in one embodiment, the meeting-video tailoring machine learning engine 150 may determine that a tailored meeting-video segment from a video received any time ago (e.g., one hour, one day, one week, one month, and so forth) should be communicated to a user.

The video services 210 may include a ranked video upload engine 214. The ranked video upload engine 214 may communicate the tailored meeting-video segment to the corresponding meeting-video management client 120A, as discussed below with respect to FIG. 2B. For example, after the content receiver engine 212 receives the video and after the meeting-video tailoring machine learning engine 150 generates the tailored meeting-video segments, the ranked video upload engine 214 may communicate the tailored meeting-video segments to the corresponding meeting-video management client 120A. In some embodiments, the ranked video upload engine 214 may communicate a plurality of tailored meeting-video segments 232 to a plurality of respective meeting-video management clients 120 based on an asynchronous or synchronous communication scheme.

The ranking computation engine 160 includes the scoring computation logic 202 and/or the ranking computation logic 162. The scoring computation logic 202 and/or ranking computation logic 162 are configured to compute and assign an overall score to each clip, for example, that may be generated by the clip-generator machine learning engine 140. The overall score may be computed based on the user profile 236, the enterprise profile 238, the meeting-video content 132, or any combination thereof. For example, the scoring computation logic 202 may compute a plurality of parameter scores for each clip. The plurality of parameters scores may correspond to a drama parameter (that may be based on a variation of pitch-per-frame), a visualization parameter (that may be based on a ratio of red-green-blue (RGB) data), emotion parameter (that may be based on facial expressions of the speaker), and so forth (hereinafter collectively called "parameters"). The scoring computation logic 202 may communicate the plurality of parameter scores for each clip to the ranking computation logic 162.

In one embodiment, the ranking computation logic 162 is configured to implement a multi-criteria decision-making (MCDM) algorithm, such as an analytical hierarchy process (AHP). Based on the user profile 236, the enterprise profile 238, the meeting-video content 132, and/or the plurality of parameter scores, the ranking computation logic 162 may rank the parameters with respect to one another. In one embodiment, the parameters that were most liked by the user or the users sharing the role may be ranked higher than the other parameters. For example, for n number of parameters, the parameters may be ranked from 1 to n, such that the value assigned the parameters becomes the parameter score. As another example, the parameters may be assigned parameter scores based on a likelihood that a user or user's role prefers a particular parameter. In this example, if a user prefers a first parameter four times more than a second parameter (e.g., based on the feedback associated with the user profile 236 or enterprise profile 238), the first parameter may be assigned a parameter score of 4, while the second parameter may be assigned a parameter score of 1. It should be understood that the parameter score may be determine by any suitable statistical analysis method, such as any suitable model that calculates parameter score with a $90^{th}$ percentile confidence value.

After the ranking computation logic 162 computes the parameter scores for the plurality of parameters, the ranking computation logic 162 may calculate a parameter matrix that includes the parameter scores for each parameter arranged in an N by N matrix. The ranking computation logic 162 may normalize the parameter matrix to generate a pairwise comparison matrix. For example, the ranking computation logic 162 may normalize the parameter matrix by employing any suitable algorithm, such as generating a reciprocal matrix of the parameter matrix, appending the reciprocal matrix to the parameter matrix (e.g., the end of the last column of the parameter matrix), and dividing each entry of the in a corresponding column by the sum of the entries in the corresponding column. In this manner, a normalize matrix may be generated to account for relative importance of the parameters with respect to each other.

In certain embodiments, after generating the normalized matrix, the ranking computation logic 162 may compute an Eigen vector. The Eigen vector may be computed by taking an average of the entries in a row. In one embodiment, the Eigen vector is computed for each row. The ranking computation logic 162 may calculate weighted scores by multiplying the parameter scores with respective parameters weights from the Eigen vector. The ranking computation logic 162 may compute the parameter score by adding the weighted scores for each clip.

By employing these steps for benefit parameters (e.g., parameters that a user prefers) and cost parameters (e.g., parameters that a user prefers to be minimized), respectively, the ranking computation logic 162 may determine weighted benefit scores and weighted cost scores. The ranking computation logic 162 may take the ratio of the weighted benefit score and the weighted cost score to compute the overall score for each clip. In some embodiments, the ranking computation logic 162 may rank each clip relative to one another based on the overall scores (e.g., the ratios of the weighted benefit score and the weighted cost score) for the clips. For example, the clip with the highest overall score may be ranked first and the clip with the lowest overall score may be ranked last.

In some embodiments, the AI training service 220 includes other users' meeting-video tailoring machine learning models 222. To provide users with uniquely tailored content, users may be associated with a corresponding meeting-video tailoring machine learning model 222. For example, a first user may be associated with a first meeting-video tailoring machine learning model, while a second user may be associated with a second meeting-video tailoring machine learning model. Alternatively, the first user and the second user may be assigned the same meeting-video tailoring machine learning models. For example, the first user and the second user may be associated with common roles (e.g., within an enterprise). In this manner, the tailored meeting-video segments may be generated based on the user data of both the first user and the second user.

In some embodiments, the AI training service 220 includes similar videos logic 224. The similar videos logic 224 may associate similar videos to each other. The similar videos logic 224 may associate similar videos by extracting and comparing metadata of a new video with metadata of existing videos. The metadata may be extracted from the new video at the video, shot, frame, or reel level. For example, a first video may include a round table discussion speech in which the voices of various speakers is periodically detected. The similar videos logic 224 may associate the first video to metadata classifying the first video as a round table discussion. Based on this association, the similar videos logic 224 may apply the clip-generator machine learning engine 140 associated with round table discussion videos to generate clips for the first video based on the metadata classifying the first video as a round table discussion. In this manner, existing clip-generator machine learning engine 140 may be applied to similar videos to improve training and accuracy of the clip-generator machine learning engine 140.

With reference to FIG. 2B, FIG. 2B includes an exemplary meeting-video management system for providing tailored meeting-video segments to a plurality of meeting-video management clients using a meeting-video management engine in the meeting-video management system, in accordance with aspects of the technology described herein. FIG. 2B includes components that correspond to components described with reference to FIG. 2A. As discussed above, the clip-generator machine learning model 144 (FIG. 1B) may generate at least one clip that defines video data 134 corresponding to the meeting-video content. As discussed above and as illustrated, the meeting-video management engine 110 of the meeting-video management system 100 may access the video data 134, the meeting data 136, and the user data 138.

Based on the meeting-video content, the video data 134, the meeting data 136, and the user data 138, the meeting-video tailoring machine learning engine 150 may generate a plurality of tailored meeting-video segments 242 that are assembled together as edited video content 240. In one embodiment, the ranked video upload engine 214 (FIG. 2A) of the meeting-video tailoring machine learning engine 150 communicates the edited video content to target users (i.e., meeting-video management clients 120). In the illustrated example, the meeting-video tailoring machine learning engine 150 communicates respective edited video content 240 to M number of different meeting-video management clients 120. In the illustrated example, the edited video content 240 communicated to the M number of meeting-video management client 120A $N_A$, $N_B$, and $N_m$ number of tailored meeting-video segments 242, respectively. M, $N_A$, $N_B$, and $N_m$ may be any real number greater than zero. Accordingly, it should be understood that the meeting-video tailoring machine learning engine 150 may generate and communicate any number of tailored meeting-video segments 242 to any number of respective meeting-video management clients 120.

Furthermore, it should be understood that the meeting-video tailoring machine learning engine 150 may communicate similar or different tailored meeting-video segments 242 to the meeting-video management clients 120. For example, a first meeting-video management client 120A may receive only one tailored meeting-video segment 242 as part of the edited video content 240A, and a second meeting-video management client 120B may receive four tailored meeting-video segment 242 as part of the edited video content 240B. In one embodiment, the edited video content 240A and the edited video content 240B may share at least one tailored meeting-video segment 242. In another embodiment, the edited video content 240A and the edited video content 240B may include tailored meeting-video segments 242 that are unique to the respective edited video content 240 and that are not shared between the edited video content 240A and the edited video content 240B.

Figure 3A:
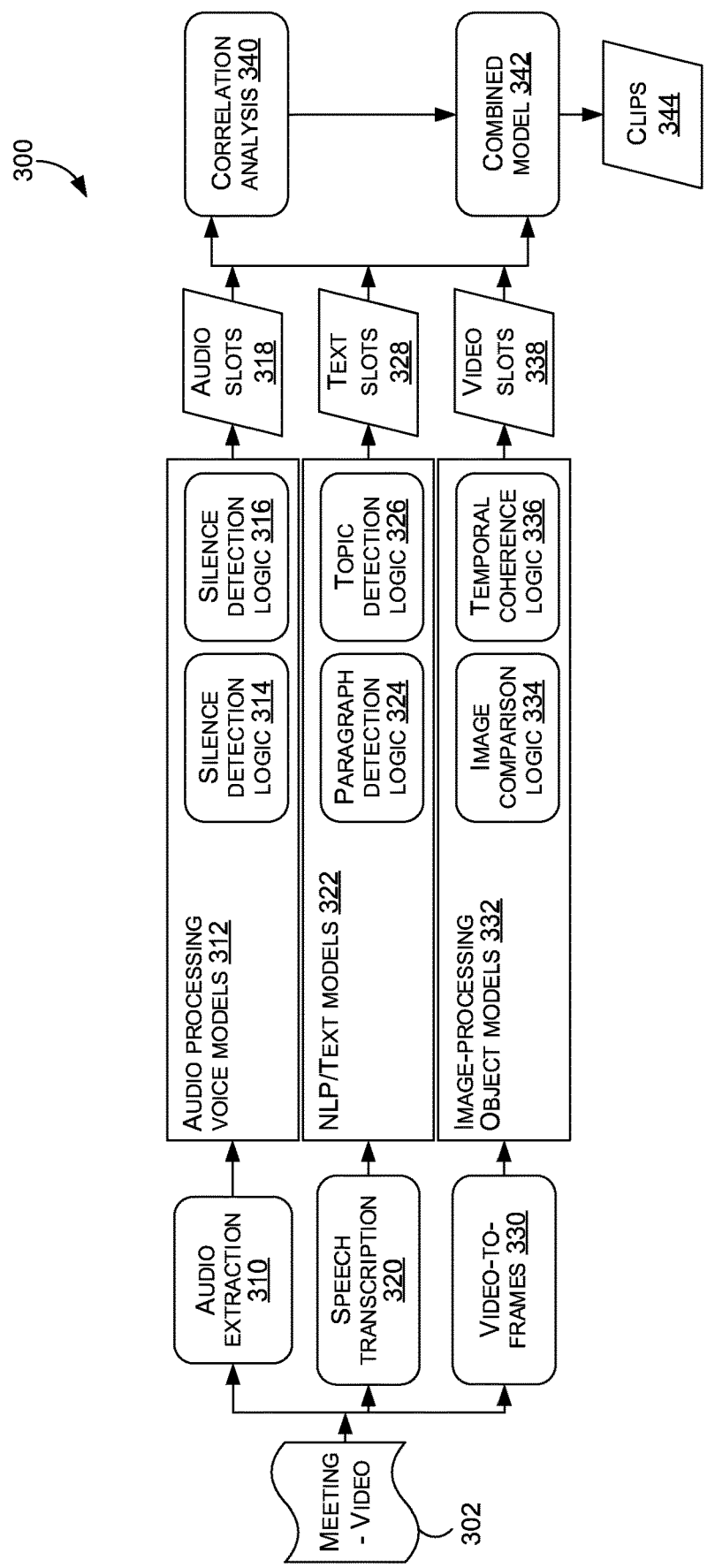
FIG. 3A provides a first exemplary method of providing one or more clips using a meeting-video management engine in a meeting-video management system, in accordance with aspects of the technology described herein.
Figure 3B:
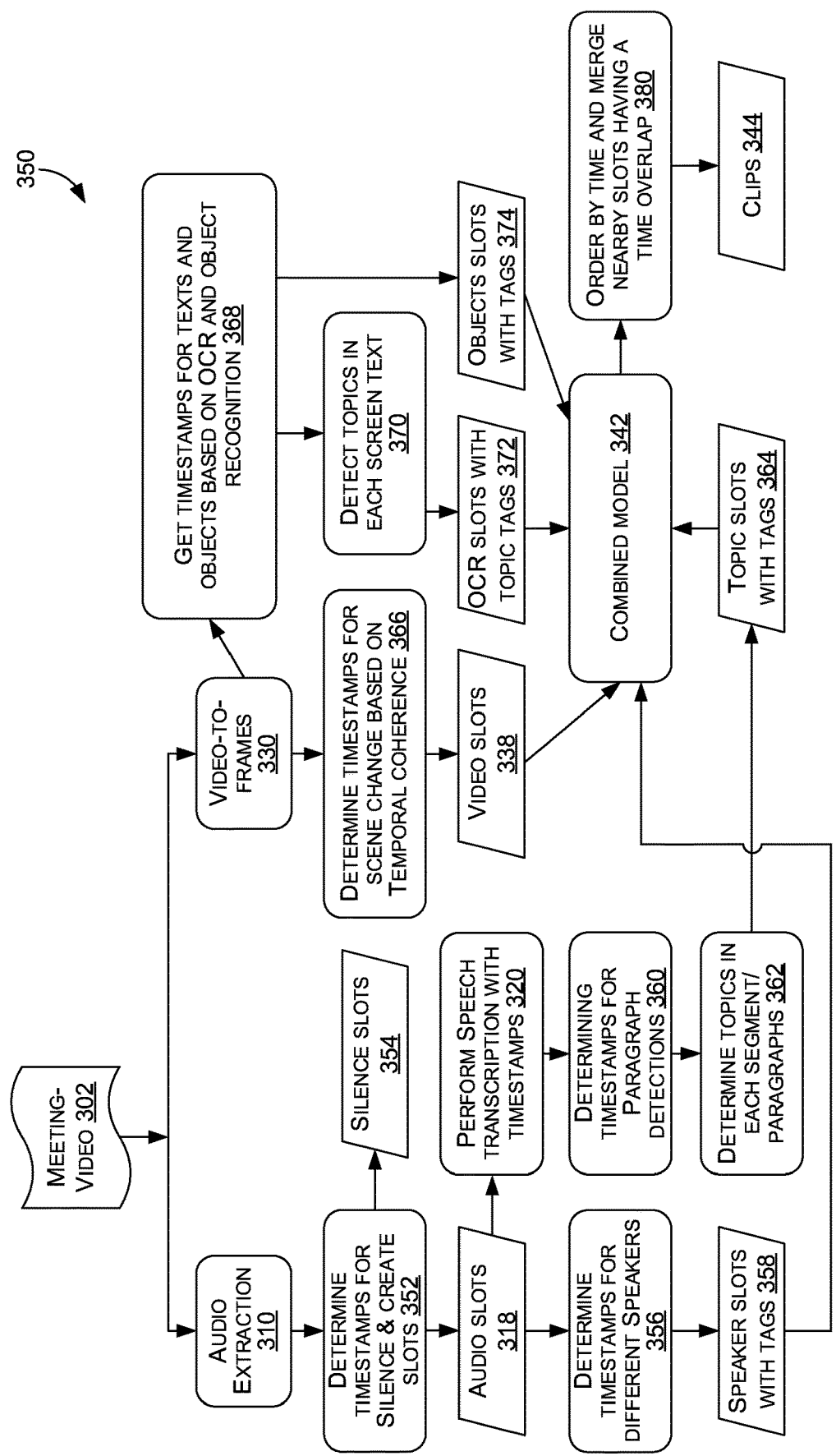
FIG. 3B provides a second exemplary method of providing one or more clips using a meeting-video management engine in a meeting-video management system, in accordance with aspects of the technology described herein.

With reference to FIGS. 3A and 3B, flow diagrams are provided illustrating methods for providing one or more clips from a video (e.g., meeting-video 302) using a meeting-video management engine in a meeting-video management system. In some embodiments, the clip-generator machine learning engine 140 (FIG. 1B) is configured to perform the methods illustrated in FIGS. 3A and/or 3B. In some embodiments, one or more computer-storage media having computer-executable or computer-useable instructions embodied thereon that, when executed, by one or more processors can cause the one or more processors to perform the methods (e.g., computer-implemented method) in the meeting-video management system 100 (e.g., a computerized system or computing system).

Turning to the process 300 illustrated in FIG. 3A, the meeting-video management engine 110 may receive a meeting-video 302. Certain data may be extracted from the meeting-video 302. In certain embodiments, audio extractions 310 may be performed on the meeting-video 302 by employing any number of audio processing voice models 312. For example, the audio processing voice models 312 may include a silence detection logic 314 configured to detect pauses in the audio extracted from the meeting-video 302. In addition or alternatively, the audio processing voice models 312 may include a speaker detection logic 316 to determine during which time periods audio is continuously being provided, an identity of the speaker delivering the audio, and the like. Audio slots 318 may be generated based on the audio processing voice models 312 being applied to the audio extractions 310. Audio slots 318 may refer to portions of the video which are not silent and that include audio.

In certain embodiments, speech transcriptions 320 may be performed on the meeting-video 302 by employing any number of natural language processing (NLP) text models 322. For example, the NLP text models 322 may include paragraph detection logic 324 configured to divide the speech transcriptions 320 into paragraphs based on the text in the speech transcription 320. In addition or alternatively, the NLP text models 322 may include a topic detection logic 326 configured to group content of the speech into topics, subjects, or categories. Text slots 328 may be generated based on the NLP text models 322 being applied to the speech transcriptions 320. Text slots 328 may refer to portions of the video which are associated with text because text is presented on the screen, because the audio associated with that segment of the video includes audio that can be transcribed into speech, or the like.

In certain embodiments, video-to-frame operation(s) 330 are performed on the meeting-video 302. Video-to-frame operations 330 refers to computations performed to convert a video stream into image sequences for purposes of analyzing the individual image sequences (or frames). The video-to-frame operations 330 may include employing a number of image-processing object models 332. For example, the image-processing object models 332 may include image comparison logic 334 configured to compare parameters of a frame of the meeting-video 302 to parameters of existing images. In this manner, an identity or category of the frame of the meeting-video 302 may be predicted. In addition or alternatively, the image-processing object models 332 may include temporal coherence logic 336 configured to determine correlation between images (e.g., the frames of the meeting-video 302) at different times. Video slots 338 may be generated based on the image-processing object models 332 being applied as part of the video-to-frame operations 330. The video slots 338 may refer to portions (e.g., frames) of the meeting-video 302 which are associated with one another. For example, a video slot 338 may include a portion of a video that focuses on a speakers, and may stop when the portion of the video transitions to focus on another aspect (e.g., the audience).

The process 300 includes performing correlation analysis 340, in which the audio slots 318, the text slots 328, and the video slots 338 are associated with common features. Performing correlation analysis 340 may include determining statistical relationships, whether causal or not, between two or more independent variables, such as the audio slots 318, the text slots 328, and/or the video slots 338. In one embodiment, the two or more independent variables may be linearly related. Example correlation analysis 340 includes calculated a Pearson correlation coefficient, a Spearman's rank correlation coefficient, and the like. By way of non-limiting example, silence in the audio slots 318 may be correlated to a transition in images of a sequence of frames of the video slots 338.

Based on the correlation analysis 340, certain audio slots 318, text slots 328, and/or video slots 338 may be combined into a combined model 342. The combined model 342 may include audio slots 318, text slots 328, and/or video slots 338 taken from the same or different times of the meeting-video 302. The audio slots 318, text slots 328, and/or video slots 338 may be combined into a combined model 342 that is output as a clip 344.

Turning to FIG. 3B, illustrated is a second exemplary process 350 for generating clip(s) 344. The meeting-video management engine 110 may receive a meeting-video 302. Certain data may be extracted from the meeting-video 302. As illustrated, audio extraction 310 and video-to-frame operations 330 may be performed. Audio extraction 310 may include identifying timestamps for silence and creating slots (block 352). The slots created via the audio extraction 310 may include silence slots 354 and audio slots 318. Silence slots 354 may refer to portions of the audio extracted from the meeting-video 302, which does not include sound.

In some embodiments, the audio slots 318 may correspond to audio from different speakers or presenters. Accordingly, the process 350 includes determining timestamps for the different speakers (block 356) associated with the audio slots 318. In one embodiment, each audio slot 318 corresponds to at least one speaker. A speaker slot with tags 358 may be generated, for example, based on the determined timestamp for the corresponding speaker. The speaker slot with tags 358 may be the timestamp of the audio slot 318 at which a corresponding speaker is identified to be speaking. The tags of the speaker slot may correspond to metadata associated with the speakers slot. The metadata may include an identity of the speaker, a role of the speaker, a URL linking to the speaker's biography or website, or any other suitable information of the speaker.

As discussed above with respect to FIG. 3A, speech transcriptions 320 may be performed. In one embodiment, speech transcriptions 320 include determining timestamps for paragraph detections (bock 360). Topics in each paragraph may be determined (block 362), as discussed above with respect to the topic detection logic 326 (FIG. 3A). In this manner, topic slots with tags 364 are generated. The tags of the topic slot may correspond to metadata associated with the topic slot. The metadata may include a theme of the topic slot, a subject being discussed at the corresponding timestamps, and so forth.

As discussed above with respect to FIG. 3A, video-to-frame operations 330 are performed on the meeting-video 302. Video-to-frame operations 330 refers to computations performed to convert a video stream into image sequences for purposes of analyzing the individual image sequences (or frames). In some embodiments, the process 350 includes determining the timestamps for scene change based on temporal coherence (block 366). The scene change may be determined based on the image comparison logic 334 (FIG. 3A) and the temporal coherence logic 336 (FIG. 3A). Video slots 338 having video content between the determined timestamps may be generated based on the image-processing object models 332 (FIG. 3A) being applied as part of the video-to-frame operations 330.

Additionally or alternatively, the process 350 includes determining timestamps for texts and objects based on optical character recognition (OCR) and/or object recognition (block 368). The frames of the video may include text on the corresponding frame. For frames having text, the process 350 includes determining topics of the screen text (block 370). The topics may be determined based on OCR. OCR may refer to a set of computer vision operations that convert images or frames of digital or hand-written text images to machine readable text. In some embodiments, OCR may include (1) a convolution layer that receives an image and converts the image to a convolutional feature map, (2) a recurrent layer employing deep-bidirectional long short-term memory (LSTM), and/or (3) a transcription layer that makes per-frame predictions and generates a predicted sequence of text over the frames (e.g., over time). In this manner, topics for each frame may be detected (block 370) and OCR slots with topic tags 372 may be generated. The topic tags of the OCR slot may correspond to metadata associated with the topic slot. The metadata may include a theme of the text predicted on the topic slot, a subject of the text at the corresponding timestamps, and so forth. Similarly, objects slots with tags 374 may be generated for the period between timestamps determined in block 368. The tags of the object slot may correspond to metadata associated with the object slot. The metadata may include an identity of the object detected in the frame of the meeting-video 302, a description of the object, and so forth.

As discussed with respect to FIG. 3A, a combined model 342 may be generated. The combined model 342 may include a merge of the speaker slots with tags 358, the video slots 338, the topic slots with tags 364, the OCR slots with topic tags 372, and/or the object slots with tags 374 (hereinafter collectively referred to as "tags"). In one embodiment, the speaker slots with tags 358, the video slots 338, the topic slots with tags 364, the OCR slots with topic tags 372, and/or the object slots with tags 374 having the same timestamps may be merged. For example, the speaker slots with tags 358, the video slots 338, the topic slots with tags 364, the OCR slots with topic tags 372, and/or the object slots with tags 374 associated with the time period between the timestamps of 2 minutes and 2 minutes and thirty seconds may be merged into the combined model 342. Combining the tags may generate the clips 344.

In some embodiments, the speaker slots with tags 358, the video slots 338, the topic slots with tags 364, the OCR slots with topic tags 372, and/or the object slots with tags 374 may be associated with different timestamps. In this case, the tags may be ordered by time and nearby slots having a timestamp overlap are merged (block 380). For example, the speaker slots with tags 358, the video slots 338, the topic slots with tags 364, the OCR slots with topic tags 372, and/or the object slots with tags 374 may each have different timestamps. The tags are merged between the overlapping timestamps. The merger of the tags generates the clips 344.

Figure 4A:
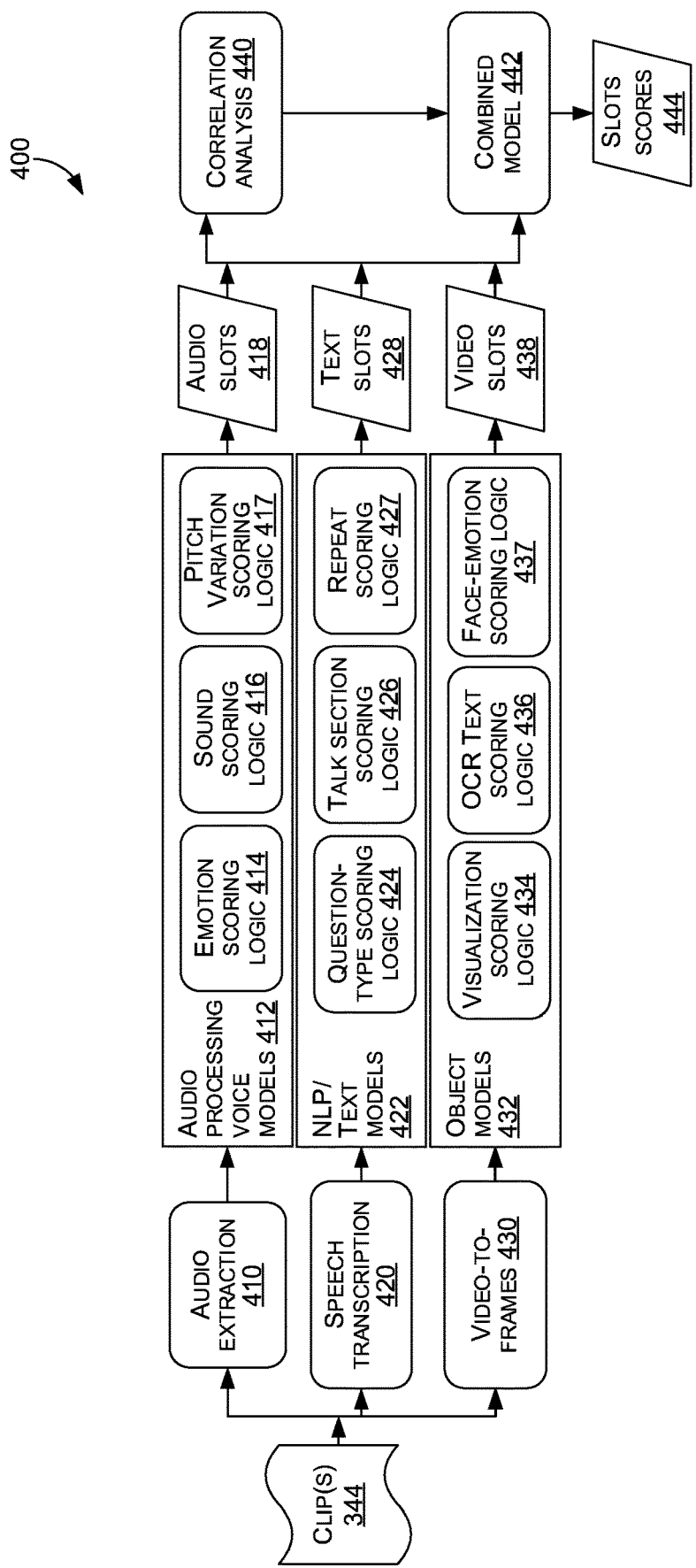
FIG. 4A provides a provides a first exemplary method of providing one or more scores corresponding to the one or more clips, in accordance with aspects of the technology described herein.
Figure 4B:
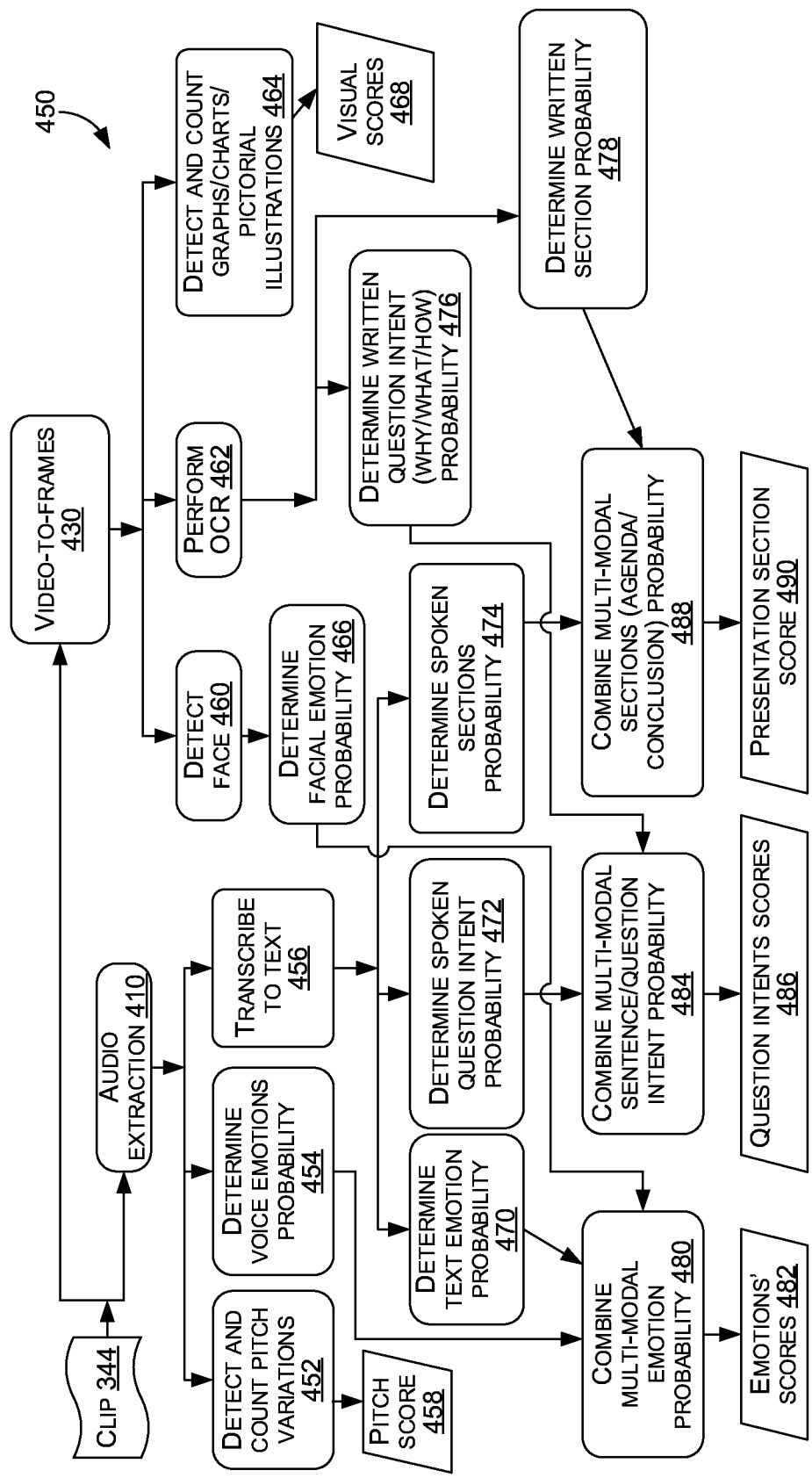
FIG. 4B provides a provides a second exemplary method of providing one scores to the one or more clips, in accordance with aspects of the technology described herein.

With reference to FIGS. 4A and 4B, flow diagrams are provided illustrating methods for providing one scores to the one or more clips 344 generated by the exemplary methods of FIGS. 3A and 3B using a meeting-video management engine in a meeting-video management system. The clips 344 may be scored using any number of probabilistic classification models. For example, the clips 344 may be scored based on parallel cognitive analysis and/or multimodal analysis. To reduce the computational burden of scoring, the size of the clip 344 may be reduced by employing any suitable map-reduce technique. Furthermore, various metrics, such as term-frequency metrics and/or inverse-document frequency, may be employed to score the clip 344. In some embodiments, the ranking computation engine 160 (FIG. 1B) is configured to perform the methods illustrated in FIGS. 3A and/or 3B. In some embodiments, one or more computer-storage media having computer-executable or computer-useable instructions embodied thereon that, when executed, by one or more processors can cause the one or more processors to perform the methods (e.g., computer-implemented method) in the meeting-video management system 100 (e.g., a computerized system or computing system).

Turning to the process 400 illustrated in FIG. 4A, the meeting-video management engine 110 may receive a clip 344. Certain data may be extracted from the clips 344. In certain embodiments, audio extractions 410 may be performed on the clip 344 by employing any number of audio processing voice models 412. For example, the audio processing voice models 412 may include an emotion scoring logic 414 configured to determine an emotion indication (e.g., sad, happy, scared, and so forth) of the clip 344. In addition or alternatively, the audio processing voice models 412 may include sound scoring logic 416 to determine a value indicative of the volume of the clip 344. In addition or alternatively, the audio processing voice models 412 may include pitch variation scoring logic 416 to determine a value indicative of a modulation of the sound, average pitch of the sound of the clip 344, and the like. Audio scores 418 may be generated based on the audio processing voice models 412 being applied to the audio extractions 410. Audio scores 418 may include a value for the corresponding audio extraction 410.

In certain embodiments, speech transcriptions 420 may be performed on the clip 344 by employing any number of natural language processing (NLP) text models 422. For example, the NLP text models 422 may include question-type scoring logic 424 configured to determine that the audio in the clip 344 includes a question. The question may be determined by identifying certain words, such as "why", "what", and "how", and the like. In addition or alternatively, the NLP text models 422 may include a topic section scoring logic 426 configured to determine a topic, subject, or category associated with the clip 344 and assign a corresponding score to the topic. In addition or alternatively, the NLP text models 422 may include repeat scoring logic 427 configured to determine repeated phrases or words within the clip 344 and assign a corresponding score to the repetition. A text score 428 may be generated based on the NLP text models 422 being applied to the speech transcriptions 420. Text score 428 may refer to a score assigned to the speech transcriptions by the NLP text models 422.

In certain embodiments, video-to-frame operation(s) 430 are performed on the clip 344. Video-to-frame operations 430 refers to computations performed to convert a video stream into image sequences for purposes of analyzing the individual image sequences (or frames). The video-to-frame operations 430 may include employing at least one object models 432. For example, the object model 432 may include visualization logic 434 configured to detect features in a clip. For example, the visualization logic 434 may detect a face, graphs, charts, illustrations, pictures, background materials, and so forth. In this manner, the visual content of a clip may be categorized. In addition or alternatively, the object model 432 may include OCR text scoring logic 436 configured to calculate a value to OCR text on the clip. The value of the OCR text may be calculated by employing the convolution layer, the recurrent layer, and/or the transcription layer discussed above. In addition or alternatively, the object model 432 may include face-emotion scoring logic 437 configured to calculate a value indicative of an emotion associated with facial features of a face detected by the visualization scoring logic 434. Video scores 438 may be generated based on the object models 432 being applied as part of the video-to-frame operations 330. The video scores 438 may refer to a score assigned to the speech transcriptions by the NLP text models 422.

The process 400 includes performing correlation analysis 440, in which the audio scores 418, the text scores 428, and the video scores 438 are normalized with respect to each other. Performing correlation analysis 440 may include determining statistical relationships, whether causal or not, between two or more independent variables, such as the audio scores 418, the text scores 428, and/or the video scores 438. In one embodiment, the two or more independent variables may be linearly related. Example correlation analysis 440 includes calculated a Pearson correlation coefficient, a Spearman's rank correlation coefficient, and the like.

Based on the correlation analysis 440, certain audio scores 418, text scores 428, and/or video scores 438 may be combined into a combined model 442. The combined model 342 may include the audio scores 418, the text scores 428, and/or the video scores 438 for the clip combined together. The audio scores 418, the text scores 428, and/or the video scores 438 may be added together combined into a combined model 442 that is output as a clip score 444.

Turning to FIG. 4B, illustrated is a second exemplary process 450 for scoring the clip(s) 344. The meeting-video management engine 110 may receive at least one clip 344. As illustrated, audio extraction 410 and/or video-to-frame operations 430 may be performed. In some embodiments, the audio extraction 410 or the video-to-frame operations 430 may be omitted such that the process 450 may be performed solely based on the audio extraction 410 or the video-to-frame operations 430 (and subsequent blocks). Audio extraction 410 may include detecting and counting pitch variations (block 452), determining voice emotion probabilities (block 454), and/or transcribing the audio extraction 410 into computer-readable text (block 456). In some embodiments, a pitch score 458 may be generated based on the detected pitch variations.

Video-to-frame operations 430 may include detecting a face (block 460), performing OCR (block 462), and/or detecting (e.g., counting) graphs, charts, pictorial illustrations, and the like (block 464) in a clip 344. The graph, chart, pictorial illustration, and the like, may be detected based on the visualization scoring logic 434 (FIG. 4A). The face may be detected based on the visualization scoring logic 434 (FIG. 4A). After the face is detected, the face-emotion scoring logic 437 (FIG. 4A) may be applied to determine facial emotion probabilities 466. The detected graph, chart, pictorial illustration, and the like, may be used to compute a visual score 468 for the clip 344.

The text transcribed from the audio extraction 410 (block 456) may be used to determine text emotion probabilities (block 470), determine spoken question intent probabilities (block 472), and/or determine spoken section probabilities (block 474). First, the text emotion probabilities may be determined (block 470) by the emotion scoring logic 414 (FIG. 4A). Second, the spoken question intent probabilities may correspond to a value classifying the questions as a general or yes/no question, a special question using "wh", or a disjunctive or tag/tail question. Third, the spoken question section probabilities may be determined (block 474) for each section of a presentation, such as the introduction, agenda, and conclusion, for example. Moreover, the spoken question intent probabilities and spoken section probabilities may be determined (blocks 474 and 476) by the question-type scoring logic 424 (FIG. 4A).

Based on performing the OCR (block 462), the process 450 includes determining written question intent (block 476) and determining written sections probabilities (block 478) for the text determined by performing the OCR (block 462). The written question intent probabilities may correspond to a value classifying the questions as a general or yes/no question, a special question using "wh", or a disjunctive or tag/tail question. The written section probabilities may be determined (block 478) for each section of a presentation, such as the introduction, agenda, and conclusion, for example.

The various probabilities discussed above with respect to FIG. 4B may be combined into any number of multi-modal probabilities to generate corresponding scores. By way of non-limiting example, the determined voice emotion probabilities (block 454), the determined text emotions probabilities (block 470), and/or the determined facial emotion probabilities (block 466) may be associated, merged, and/or combined (block 480) to generate the emotions score 482. In addition or alternatively, the determined spoken question intent probabilities (block 472) and the determined written question intent probabilities 476 may be associated, merged, and/or combined (block 484) to calculate a question intent score 486. In addition or alternatively, the determined spoken section probability (block 474) and the determined written section probability 476 may be associated, merged, and/or combined (block 484) to calculate a question intent score 486. In some embodiments, the map-reduction techniques may be applied to the clip 344 to run the scoring in parallel for a plurality of clips 344.

With reference to FIGS. 5-8, flow diagrams are provided illustrating various methods. In some embodiments, all or some of the steps of FIGS. 5-8 may be performed by a meeting-video management engine (e.g., meeting-video management engine 110 in FIGS. 1-2). In some embodiments, one or more computer-storage media having computer-executable or computer-useable instructions embodied thereon that, when executed, by one or more processors can cause the one or more processors to perform the methods (e.g., computer-implemented method) in the meeting-video management system 100 (e.g., a computerized system or computing system).

Figure 5:
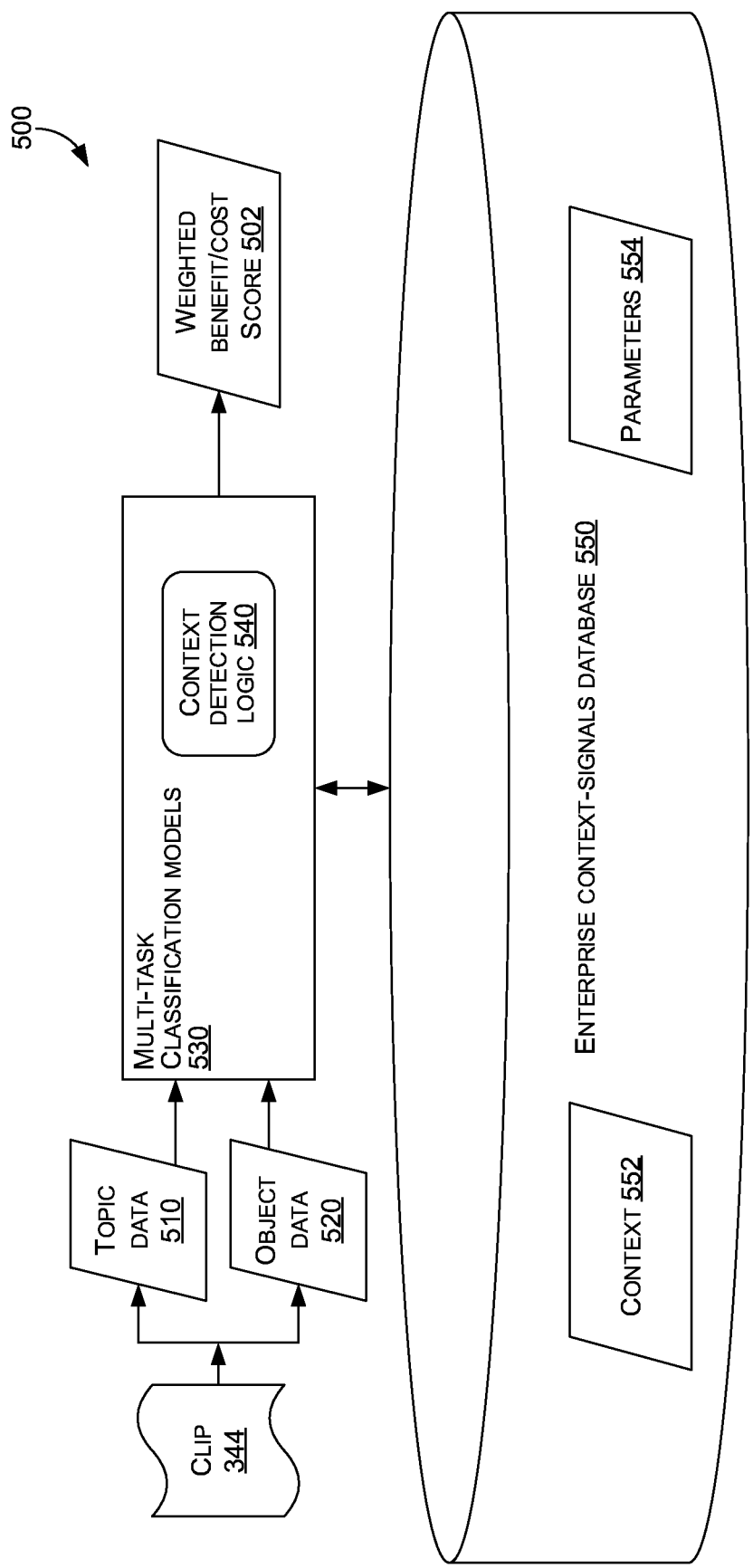
FIG. 5 provides an exemplary method of providing a weighted benefit or cost score to the one or more clips, in accordance with aspects of the technology described herein.

Turning to FIG. 5, provided is an exemplary process 500 of providing a weighted score 502 (e.g., weighted cost score or weighted benefit score) to the one or more clips generated by the exemplary methods of FIGS. 3A and 3B using a meeting-video management engine in a meeting-video management system, in accordance with aspects of the technology described herein. As discussed above with respect to FIG. 2A, the ranking computation engine 160 may determine or calculate the weighted score 502 for the clip 344. As illustrated, topic data 510 and object data 520 may be extracted from the clip 344. In some embodiments, the topic data 510 and the object data 520 may include the audio scores 418, the text scores 428, and/or the video scores 438 of FIG. 4A, as well as the pitch score 458, visual score 468, emotion score 482, question intent score 486, presentation sections score 490, and the like. For example, the topic data 510 and the object data 520 may be calculated based on one or more of the aforementioned scores.

A multi-task classification model 530 may access the topic data 510 and the object data 520 to calculate the weighted score 502, as discussed below with respect to the ranking computation engine 160 of FIG. 2A. The multi-task classification model 530 may correspond to or include the combined model 342 (FIGS. 3A and 3B) and the combined model 442 (FIG. 4A). The multi-task classification model 530 include context detection logic 540 configured to determine or calculate a context associated with the clip 344. In some embodiments, multi-task classification model 530 may access an enterprise context-signals database 550 storing context 552 and parameters 554 used to compute the weighted score 502 used to rank the tailored meeting-video segments, as discussed herein. The context 552 and/or the parameters 554 may correspond to the meeting-video tailoring features used to train the meeting-video tailoring machine learning model 154 (FIG. 1B).

First, the context 553 may include data indicative of a product, a product's services, technical benefits of a product, a team associated with the product, partners associated with the product, markets or regions in which the product is sold or used, best-practices, processes, cultural implications of the product, initiatives associated with a product, market trends, and so forth. Second, the parameters 554 may include emotion, financial indications, key performance indices (KPIs), facts and figures, milestones, timelines, titles and/or agendas of conferences/meetings, topics listed for a meeting, vision, mission, goals, summary, take-aways, conclusion, questions presented (e.g., who, why, what, where, how, when), disadvantages, advantages, and the like.

Figure 6:
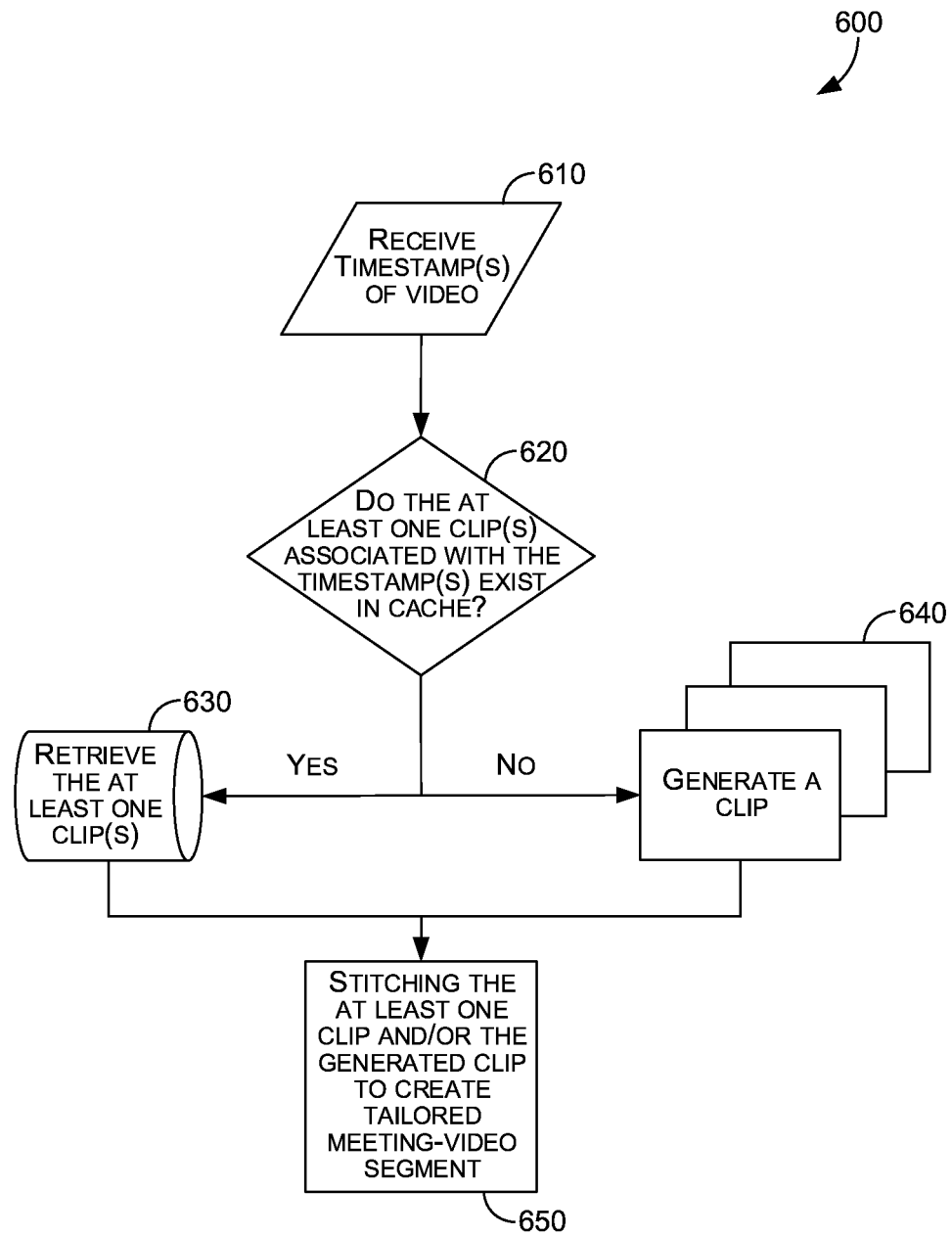
FIG. 6 provides an exemplary method of providing a tailored meeting-video segment using a meeting-video management engine in a meeting-video management system, in accordance with aspects of the technology described herein.

Turning to FIG. 6, provided is an exemplary process 600 of providing a tailored meeting-video segment using a meeting-video management engine in a meeting-video management system. As illustrated, generation of the tailored meeting-video segment may be based on timestamps associated with content determined to be relevant for a particular user (e.g., the meeting-video management client 120 (FIG. 1B)). In particular, the process 600 includes receiving (block 610) an indication of timestamps of a video. In some embodiments, the timestamps may include a start time and/or an end time, such that the content included between the start time and end time define a portion of the video (e.g., meeting-video 302 of FIGS. 3A and 3B). As discussed above, the timestamps may be determined based on process 350 (FIG. 3B). For example, the timestamps may be determined based on the combined model 342 (FIG. 3B).

Furthermore, the process 600 includes determining (block 620) whether a clip 344 (FIGS. 3A and 3B) with the timestamps exists in a cache, such as the storage 230 (FIG. 2A). In response to the at least one clip existing in the cache, the at least one clip is retrieved from the storage. Alternatively or additionally, if the clip does not exist in the cache or if only a portion of the clips exist in the cache, the process 600 includes generating a clip. The clip may be generated as discussed with respect to FIGS. 3-4. In one embodiment, the generated clip and the at least one clip retrieved from the storage may be stitched together to create the tailored meeting-video segment. It should be understood that the tailored meeting-video segment may include one or more clips from the cache (block 630) and/or one or more newly generated clips (block 640).

Figure 7:
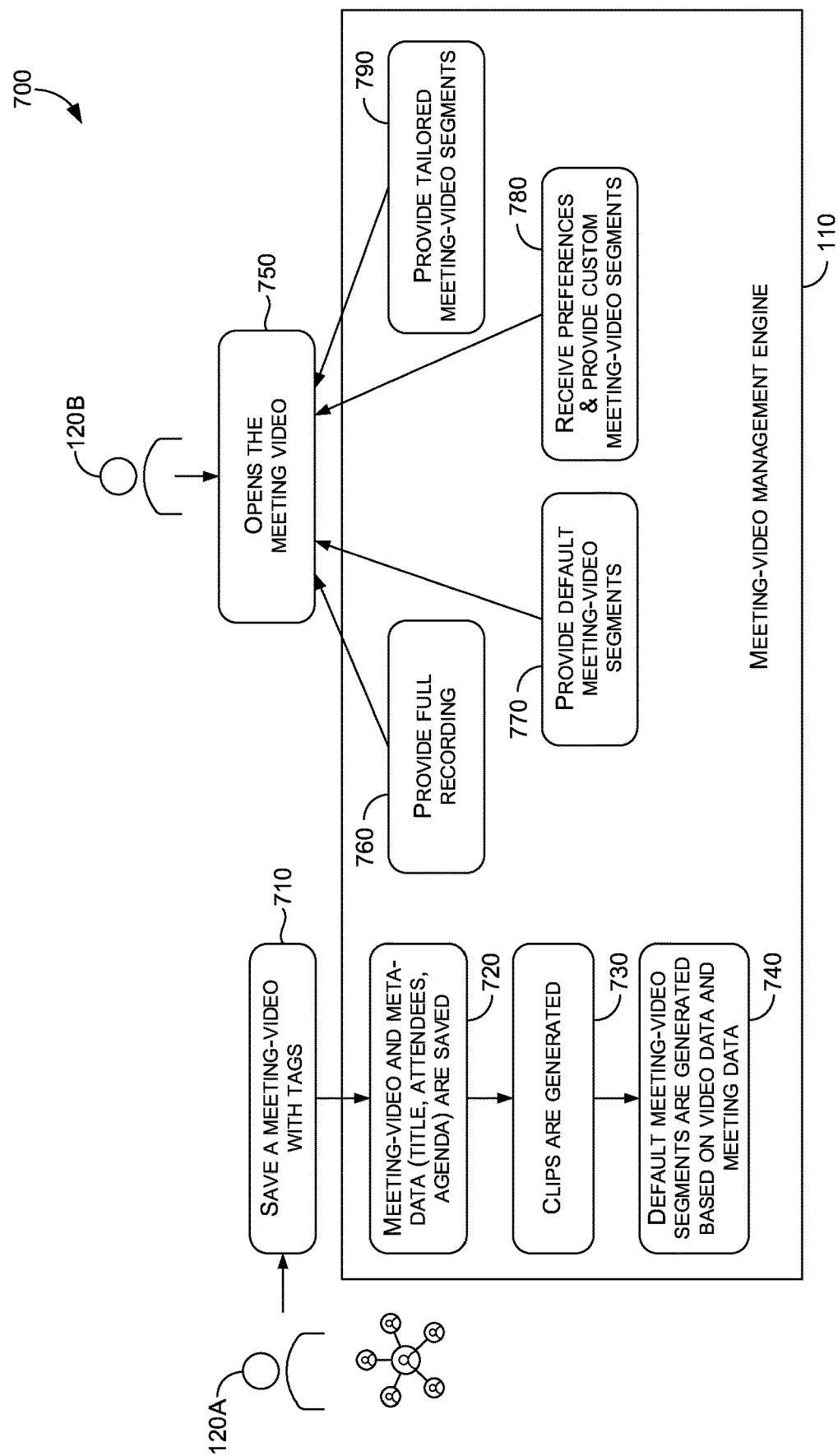
FIG. 7 provides an exemplary method of a plurality of meeting-video management clients engaging with the meeting-video management system, in accordance with aspects of the technology described herein.

FIG. 7 provides an exemplary method of a plurality of meeting-video management clients (users 120A and 120B) engaging with the meeting-video management system, in accordance with aspects of the technology described herein. The first user 120A may save (block 710) a meeting-video (e.g., recording) with tags (e.g., the tags or scores respectively discussed in FIGS. 3B and 4B). The meeting-video and associated metadata (e.g., indicative of the parameters (FIG. 5), such as title, attendees, agenda, and the like) may be saved (block 720). Based on the meeting-video and the associated metadata, clips are generated (block 730), as discussed with respect to the clip-generator machine learning engine 140 of FIG. 1 and the processes of FIGS. 3A and 3B. Default meeting-video segments are generated (block 740) based on meeting data and video data, such that the default meeting-video segments are not generated based on the user data. As such, the default meeting-video segments may not be specifically tailored to a particular user.

Turning to the steps associated with the second user 120B, the second user 120B may open (block 750) the meeting-video and/or any suitable control to access various types of meeting-video content. An example of an interface the second user 120B may use to access the various types of meeting-video content is illustrated with respect to FIGS. 9A and 9B. From this interface, the second user 120B may access a full recording of a meeting-video, defaulted meeting-video segments, custom meeting-video segments, and/or tailored meeting-video segments. First, the full recording may correspond to the unedited version of the meeting-video recording. Second, the default meeting-video segments refer to portions of the full recording which have been determined to be relevant based on the video data 134 (FIG. 1B) and the meeting data 136 (FIG. 1B) discussed above. The default meeting-video segments may not be generated to be specifically unique to a particular user. Third, the custom meeting-video segment may correspond to portions of the meeting-video or of the default meeting-video segments which have been determined to be relevant based on user preferences (e.g., user profile 236 of FIG. 2A), the video data 134, and the meeting data 136. Based on a selection indicative of which set of segments the user wants to view, the meeting-video management engine 110 may provide the full recording (block 760), provide the default meeting-video segment (block 770), provide the custom meeting-video segments (block 780), and/or the tailored meeting-video segments (block 790).

FIG. 8A provides an process 800 providing a meeting-video management clients 120 (FIG. 1) with a default meeting-video segments using a meeting-video management engine 110 in a meeting-video management system 100 (FIG. 1), in accordance with aspects of the technology described herein. The process 800 includes a meeting-video management client 120 saving (block 802) a meeting-video with the tags described above with respect to FIG. 3B. The process 800 includes converting (block 804) image text and speech to text, as described above with respect to the audio extraction 310 (FIG. 3B) and the video-to-frame operations 330 (FIG. 3B). The process 800 includes converting the meeting-video 302 (FIG. 3) into one or more clips 344, for example, using the clip-generator machine learning engine 140 (FIG. 1). The process 800 includes scoring (block 808) the clips and ranking (block 810) the clips, as discussed with respect to the ranking computation engine 160 (FIG. 2A). The process 800 includes picking (block 812) and communicating the top clips (e.g., a threshold number of clips), sorted time-wise and stitched (e.g., combined), to be combined into the default meeting-video segment. The default meeting-video segment is communicated to the meeting-video management client 120 be watched or played back (block 814).

FIG. 8B provides a process 830 of providing a meeting-video management clients 120 with a tailored meeting-video segment using a meeting-video management engine 110 in a meeting-video management system, in accordance with aspects of the technology described herein. The process 830 includes a meeting-video management client 120 watching (block 832) the tailored meeting-video segments. The meeting-video management engine may track and record interactions by the meeting-video management client 120 with the tailored meeting-video segment. For example, the meeting-video management client 120 may fast-forward or skip the portion of the tailored meeting-video segment in which a particular speaker is speaking. The meeting-video management engine 110 may update the user data based on the interactions and behavior of the corresponding meeting-video management client 120.

The process 830 includes employing the meeting-video tailoring machine learning engine 150 (FIG. 1) and/or the ranking computation engine 160 (FIG. 1) to rank (block 834) a plurality of clips or a plurality of tailored meeting-video segments. In some embodiments, the clips or the tailored meeting-video segments may be ranked (block 834) based on the user data (e.g., user's interactions and behavior). Furthermore, the process 830 includes picking (block 836) and communicating the top clips (e.g., a threshold number of clips), sorted time-wise, and stitched (e.g., combined), to be combined into the tailored meeting-video segment. The tailored meeting-video segment is communicated to the meeting-video management client 120 to be watched or played back (block 838). In some embodiments, the plurality of tailored meeting-video segments may be ranked and the top tailored meeting-video segments, sorted time-wise and stitched, to be combined into an edited video content 240 (FIG. 2C), as discussed above.

FIG. 8C provides a process 850 of providing a meeting-video management clients 120 with tailored meeting-video segments using a meeting-video management engine 110 in a meeting-video management system, in accordance with aspects of the technology described herein. The process 850 includes a meeting-video management client 120 opening or watching (block 832) the meeting-video 302 (FIG. 3A). The meeting-video management client 120 may provide (block 834) preferences or feedback on the meeting-video 302. The meeting-video management engine may track and record the preferences or feedback provided by the meeting-video management client 120. For example, the meeting-video management client 120 may complete a questionnaire or a survey on the meeting-video 302 or on the tailored meeting-video-segment. The meeting-video management engine 110 may update the user data 138 based on the preferences or feedback from the corresponding meeting-video management client 120.

The process 850 includes employing the meeting-video tailoring machine learning engine 150 (FIG. 1) and/or the ranking computation engine 160 (FIG. 1) to rank (block 856) a plurality of clips or a plurality of tailored meeting-video segments. In some embodiments, the clips or the tailored meeting-video segments may be ranked (block 856) based on the user data 138 (e.g., user's interactions and behavior). Furthermore, the process 850 includes picking (block 858) and communicating the top clips (e.g., a threshold number of clips), sorted time-wise, and stitched (e.g., combined), to be combined into the tailored meeting-video segment. The tailored meeting-video segment is communicated to the meeting-video management client 120 be watched or played back (block 838). In some embodiments, the plurality of tailored meeting-video segments may be ranked and the top tailored meeting-video segments, sorted time-wise and stitched, to be combined into an edited video content 240 (FIG. 2C), as discussed above.

Figure 9A:
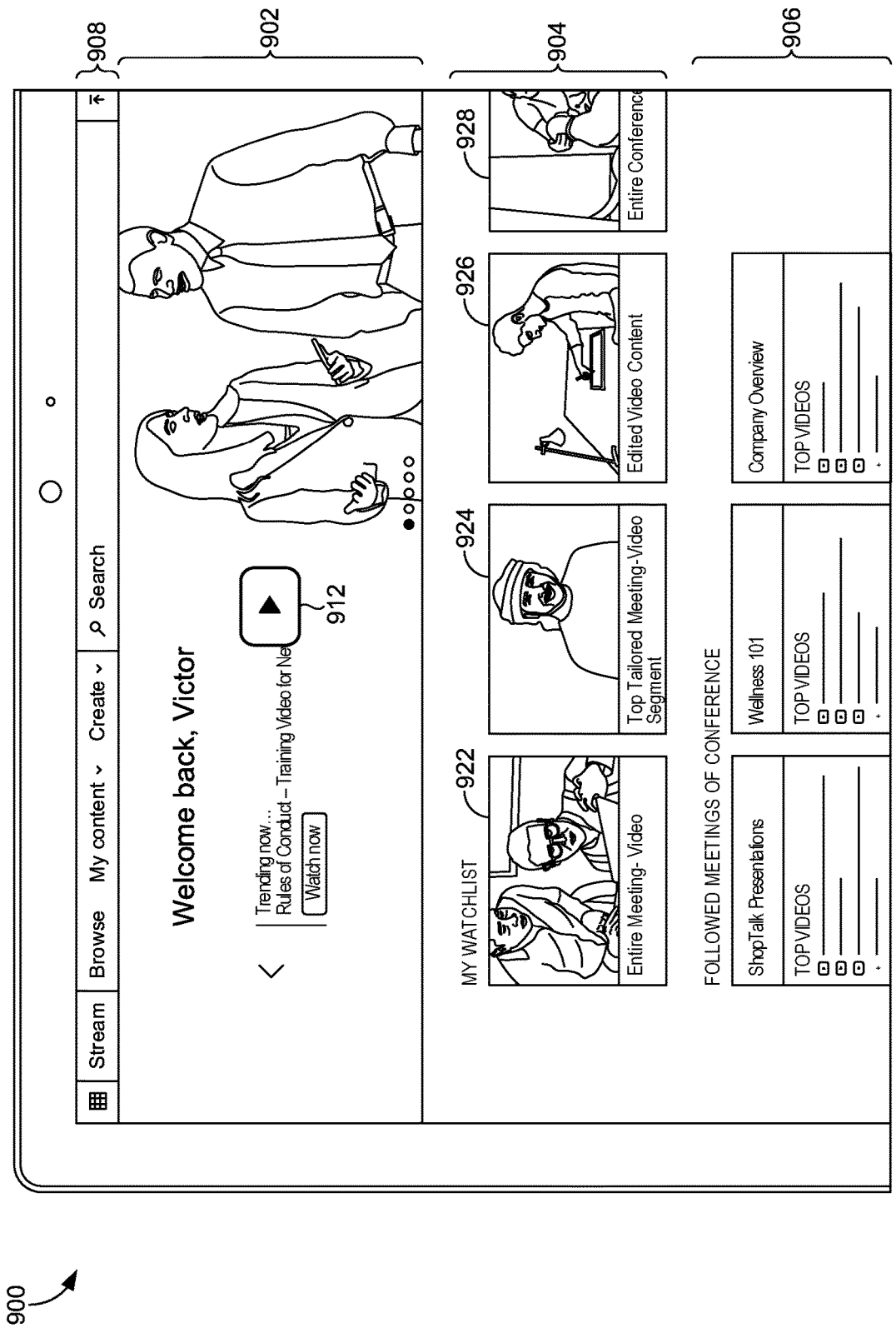
FIG. 9A provides a screenshot of a first exemplary interface generated by meeting-video management engine in a meeting-video management system, in accordance with aspects of the technology described herein.

FIG. 9A provides a screenshot of a first exemplary interface 900 generated by meeting-video management engine 110 (FIG. 1) in a meeting-video management system 100 (FIG. 1), in accordance with aspects of the technology described herein. As illustrated, the first exemplary interface 900 may be presented on a display of a desktop or laptop computing device. The first exemplary interface 900 includes a first region 902, a second region 904, a third region 906, and a fourth region 908. However, it should be understood that the meeting-video management engine 110 may generate an interface with any number of suitable regions.

In some embodiments, the first region 902 may be configured to display and/or play the meeting-video and/or a tailored meeting-video segment. To facilitate playback, the first region 902 may include a playback control 912 that, when selected, starts or stops play of the corresponding content being played on the first region 902.

In some embodiments, the second region includes any number of graphical user interface (GUI) elements corresponding to content, that when selected, is played in the first region 902. By way of example, the second region 904 may include a first GUI element 922 indicative of an entire meeting-video, a second GUI element 924 indicative of the top tailored meeting-video segment, a third GUI element 926 indicative of the edited video content, and/or a fourth GUI element indicative of an entire conference 928. In response to user selection of a GUI element, the meeting-video management engine 110 may cause the corresponding content to play on the first region. For example, in response to a user selection of the second GUI element 924, the meeting-video management engine 110 may cause the tailored meeting-video segment to playback on the first region 902.

Furthermore, the third region 906 may include a listing of the channels or meetings of a conference following by the corresponding user. In this manner, a user may manifest his/her preferences based on the meetings or channels the user has followed or pinned to the third region. Furthermore, the fourth region 908 includes a panel that includes a plurality of selectable features for controlling playback in the first region 902, for customizing the first exemplary interface 900, and so forth.

Figure 9B:
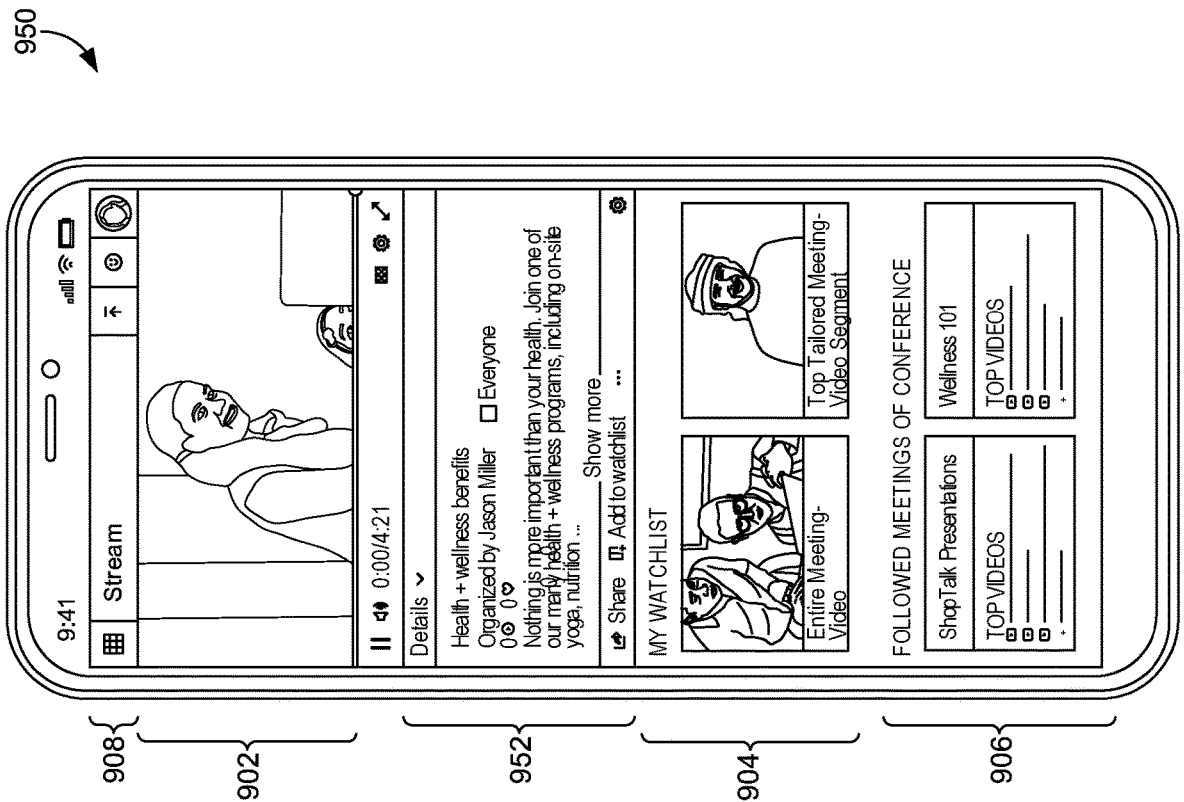
FIG. 9B provides a screenshot of a second exemplary interface generated by meeting-video management engine in a meeting-video management system, in accordance with aspects of the technology described herein.

FIG. 9B provides a screenshot of a second exemplary interface 950 generated by meeting-video management engine in a meeting-video management system, in accordance with aspects of the technology described herein. The second exemplary interface may be generated by a mobile device of the meeting-video management client 120 (FIG. 1). The second exemplary interface 950 includes the first region 902, the second region 904, the third region 906, the fourth region 908, and a fifth region 952. The fifth region 952 may provide a description of the content being presented or played on the first region 902. In one embodiment, the fifth region 952 includes text corresponding to the video data 134, the meeting data 136, and/or the user data 138.

Exemplary Methods for Providing Tailored Meeting-Video Segments

With reference to FIGS. 3, 4 and 5, flow diagrams are provided illustrating methods for providing a tailored meeting-video segment associated with a meeting-video management engine of a meeting-video management system. The methods may be performed using the virtualization system described herein. In some embodiments, one or more computer-storage media having computer-executable or computer-useable instructions embodied thereon that, when executed, by one or more processors can cause the one or more processors to perform the methods (e.g., computer-implemented method) in the virtualization system (e.g., a computerized system or computing system).

Figure 10:
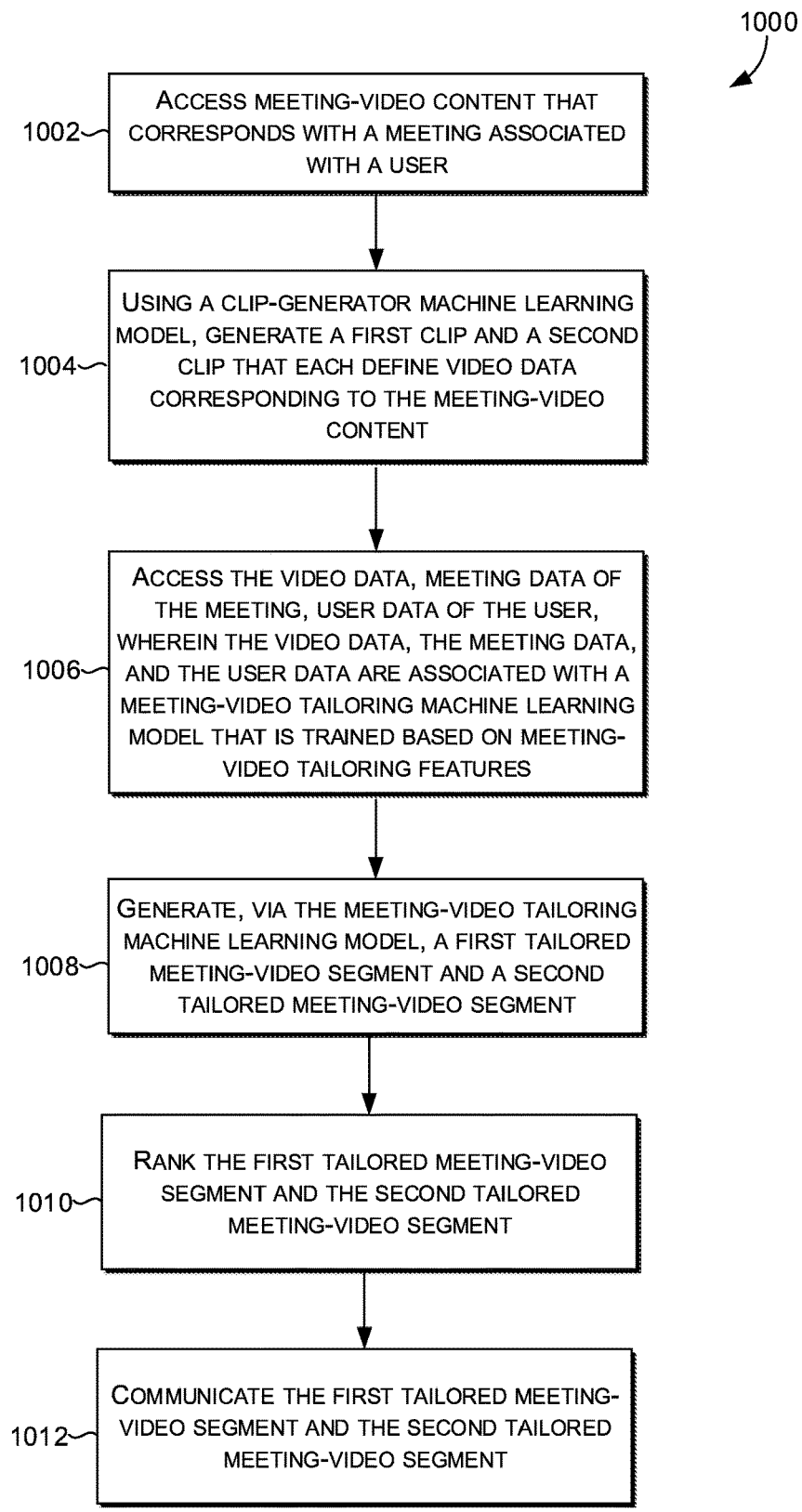
FIG. 10 provides a first exemplary method of providing tailored meeting-video segments using a meeting-video management engine of the meeting-video management system, in accordance with aspects of the technology described herein.

Turning to FIG. 10, a flow diagram is provided that illustrates a method 1000 for providing a tailored meeting-video segment associated with a meeting-video management engine of a meeting-video management system. At block 1002, meeting-video content that corresponds to a meeting associated with a user is accessed via a meeting-video management engine. At block 1004, using a clip-generator machine learning model, a first clip and a second clip that each define video data corresponding to the meeting-video content are generated. At block 1006, the video data, meeting data of the meeting, and user data of the user are accessed. The video data, the meeting data, and the user data are associated with a meeting-video tailoring machine learning model that is trained based on meeting-video tailoring features. The meeting-video tailoring features correspond to the video data, the meeting data, and the user data. The meeting-video tailoring machine learning model is configured to generate a plurality of tailored meeting-video segments of the meeting-video content.

At block 1008, based on the meeting-video content, the video data, the meeting data, and the user data, a first tailored meeting-video segment and a second tailored meeting-video segment are generated via the meeting-video tailoring machine learning model. At block 1010, the first tailored meeting-video segment and the second tailored meeting-video-segment are ranked. The first tailored meeting-video segment and the second tailored meeting-video segment are ranked based on an analytical hierarchy process in which weighted scores and weighted costs are computed for the meeting-video tailoring features.

At block 1012, the first tailored meeting-video segment and the second tailored meeting-video segment are communicated. Communicating the first tailored meeting-video segment and the second tailored meeting-video segment causes presentation of the first tailored meeting-video segment and the second tailored meeting-video segment via a client device associated with the user. Moreover, communicating the first tailored meeting-video segment and the second tailored meeting-video segment comprises transmitting the first tailored meeting-video segment and the second tailored meeting-video segment for presentation in order based on the ranking.

Figure 11:
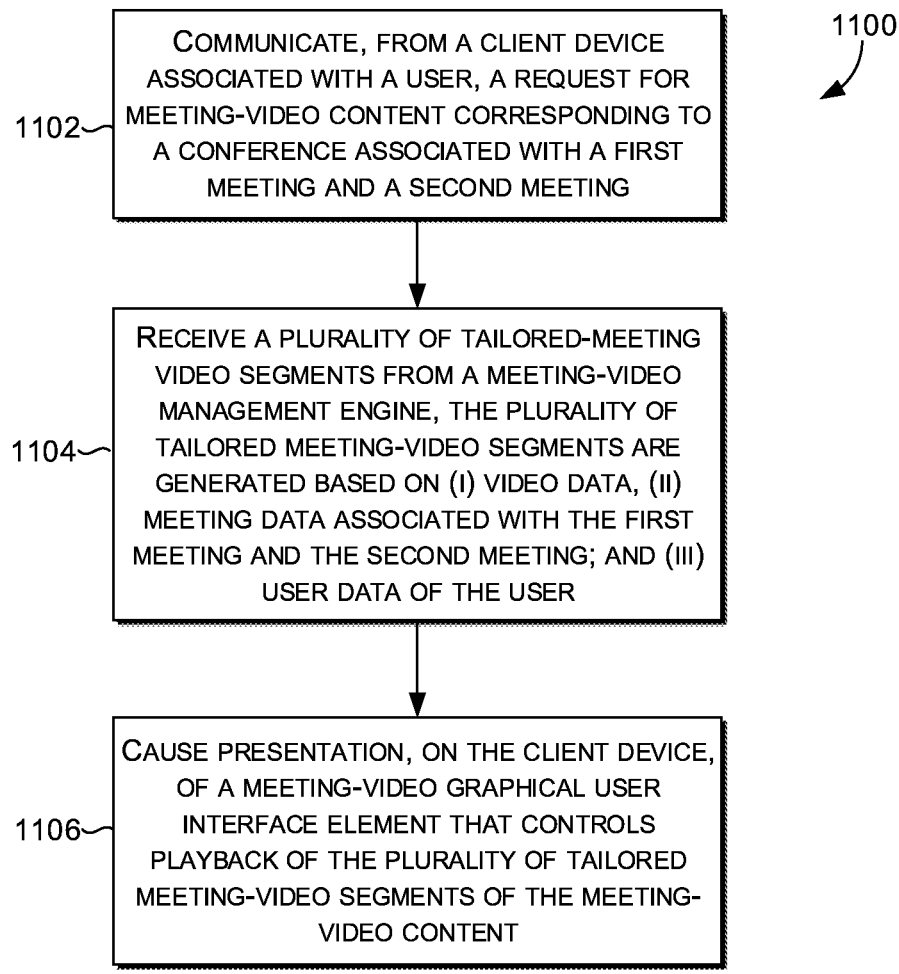
FIG. 11 provides a second exemplary method of providing tailored meeting-video segments using a meeting-video management engine of the meeting-video management system, in accordance with aspects of the technology described herein.

Turning to FIG. 11, a flow diagram is provided that illustrates a method 1100 for providing a tailored meeting-video segment associated with a meeting-video management engine of a meeting-video management system. At block 1102 a request for meeting-video content corresponding to a conference associated with a first meeting and a second meeting is communicated from a client device associated with a user. At block 1104, a plurality of tailored meeting-video segments from a meeting-video management engine are received. The plurality of tailored meeting-video segments are generated based on (i) video data, (ii) meeting data associated with the first meeting and the second meeting, and (iii) user data of the user. The video data, the meeting data, and the user data are associated with meeting-video tailoring features of a meeting-video tailoring machine learning model that is trained to generate the plurality of tailored meeting-video segments of the meeting-video content.

At block 1106, a meeting-video graphical user interface element that controls playback of the plurality of tailored meeting-video segments of the meeting-video content is caused to be presented on the client device. The meeting-video graphical user interface a first region comprising the first indication; and a second region comprising a second indication corresponding to (i) an entire video of the conference or (ii) an entire video of a meeting of the conference that, when selected, causes playback of (i) the entire video of the conference or (ii) the entire video of the meeting.

Figure 12:
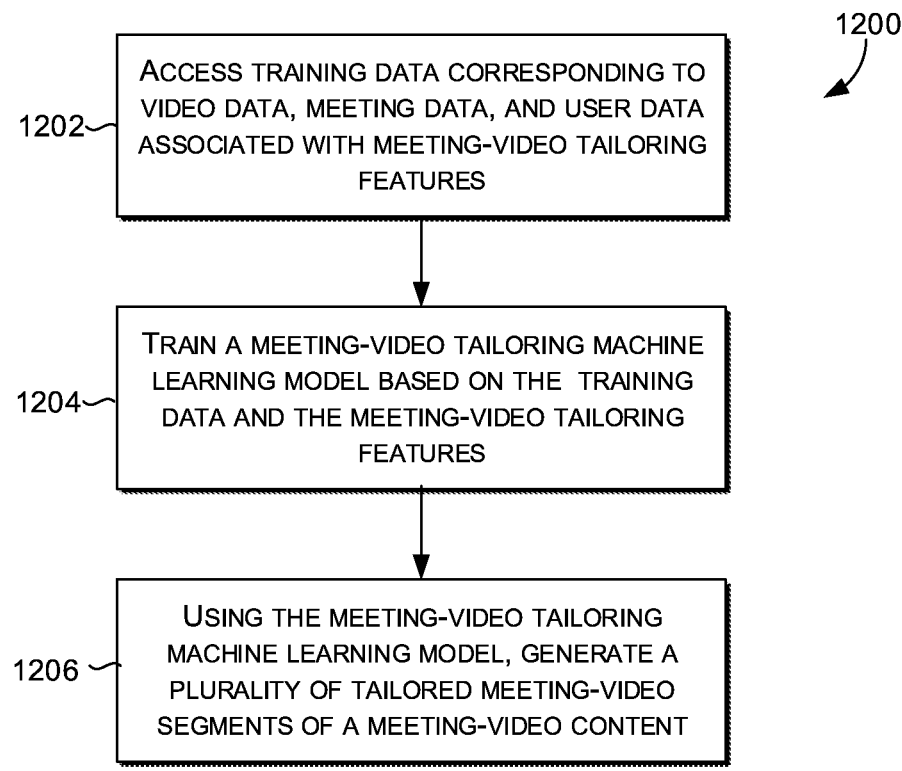
FIG. 12 provides a third exemplary method of providing tailored meeting-video segments using a meeting-video management engine of the meeting-video management system, in accordance with aspects of the technology described herein.

Turning to FIG. 12, a flow diagram is provided that illustrates a method 1200 for providing a tailored meeting-video segment associated with a meeting-video management engine of a meeting-video management system. At block 1202, training data corresponding to video data, meeting data, and user data associated with meeting-video tailoring features are accessed. At block 1204, a meeting-video tailoring machine learning model is training data and the meeting-video tailoring features. At block 1206, using the meeting-video machine learning model, a plurality of tailored meeting-video segments of meeting-video content.

Technical Improvement and Literal Support for Claims

Methods, systems, and computer storage media are provided for providing tailored meeting-video segments. In some embodiments, a computerized system includes at least one computer processor and computer memory storing computer-useable instructions that, when used by the at least one computer processor, cause the at least one computer processor to perform operations. The operations include accessing, at a meeting-video management engine, meeting-video content that corresponds to a meeting associated with a user. The operations include using a clip-generator machine learning model, generating a first clip and a second clip that define video data corresponding to the meeting-video content. The operations include accessing the video data, meeting data of the meeting, and user data of the user. The video data, the meeting data, and the user data are associated with a meeting-video tailoring machine learning model that is trained based on meeting-video tailoring features that correspond to the video data, the meeting data, and the user data. The meeting-video tailoring machine learning model is configured to generate a plurality of tailored meeting-video segments of the meeting-video content. Based on the meeting-video content, the video data, the meeting data, and the user data, the operations include generating, via the meeting-video tailoring machine learning model, a first tailored meeting-video segment and a second tailored meeting-video segment. The operations include ranking the first tailored meeting-video segment and the second tailored meeting-video-segment. The operations include communicating the first tailored meeting-video segment and the second tailored meeting-video segment.

Advantageously, these and other embodiments, as described herein, provide uniquely tailored meeting-video segments of meeting-video content. In lieu of providing full recordings, which may require large computational resource utilization associated with streaming, these and other embodiments reduce the volume of meeting-video content that is delivered to meeting attendees. Moreover, computer technology is improved in that user inputs associated with toggling to desired portions of video content are reduced because the tailored meeting-video segments have been calculated based on various meeting-video tailoring features. In this manner, a computer's resource utilization is improved since smaller, more personalized tailored meeting-video segments are streamed in lieu of full recordings.

In any combination of the above embodiments, the first tailored meeting-video segment and the second tailored meeting-video segment are ranked based on an analytical hierarchy process in which weighted scores and weighted costs are computed for the meeting-video tailoring features.

In any combination of the above embodiments, communicating the first tailored meeting-video segment and the second tailored meeting-video segment causes presentation of the first tailored meeting-video segment and the second tailored meeting-video segment via a client device associated with the user.

In any combination of the above embodiments, communicating the first tailored meeting-video segment and the second tailored meeting-video segment includes transmitting the first tailored meeting-video segment and the second tailored meeting-video segment for presentation in order based on the ranking.

In any combination of the above embodiments, the meeting-video tailoring features include video data features, meeting data feature, user data feature, wherein the meeting-video tailoring features represent machine learning metrics relating meeting content, video content, and a user.

In any combination of the above embodiments, the meeting-video tailoring features include video data features indicative of audio features comprising an emotion score, a sound score, a pitch variation score, a silence score, or any combination thereof; speech features comprising question type score, talk section score, repeated content score, or any combination thereof; and video features comprising an identity of a speaker, an emotion of the person speaking, a pitch variation of audio, or any combination thereof. The meeting-video tailoring features include user data features indicative of an identity of the user, user preferences, user feedback, a time zone of the user, a role associated with the user, or any combination thereof. The meeting-video tailoring features include meeting data features indicative of a date of the meeting, the speaker, a planned time duration, and actual time duration, a sponsor, or any combination thereof.

In any combination of the above embodiments, the clip-generator machine learning model is trained based on meeting data features or video data features corresponding to the video data and is configured to generate the first clip and the second clip, wherein the first tailored meeting-video segment includes the first clip, the second clip, or both, wherein the meeting data features and the video data features correspond to clip-generator machine learning features.

In any combination of the above embodiments, including a data structure a data structure storing the meeting-video tailoring features used to train the meeting-video tailoring machine learning model, wherein the meeting-video tailoring features include a video data feature, a meeting data feature, and a user data feature each organized in a database as respective records, wherein the video data feature, the meeting data feature, and the user data feature include database entries corresponding to the video data, the meeting data, and the user data, respectively.

Additional Support for Detailed Description of the Invention

Example Distributed Computing System Environment

Figure 13:
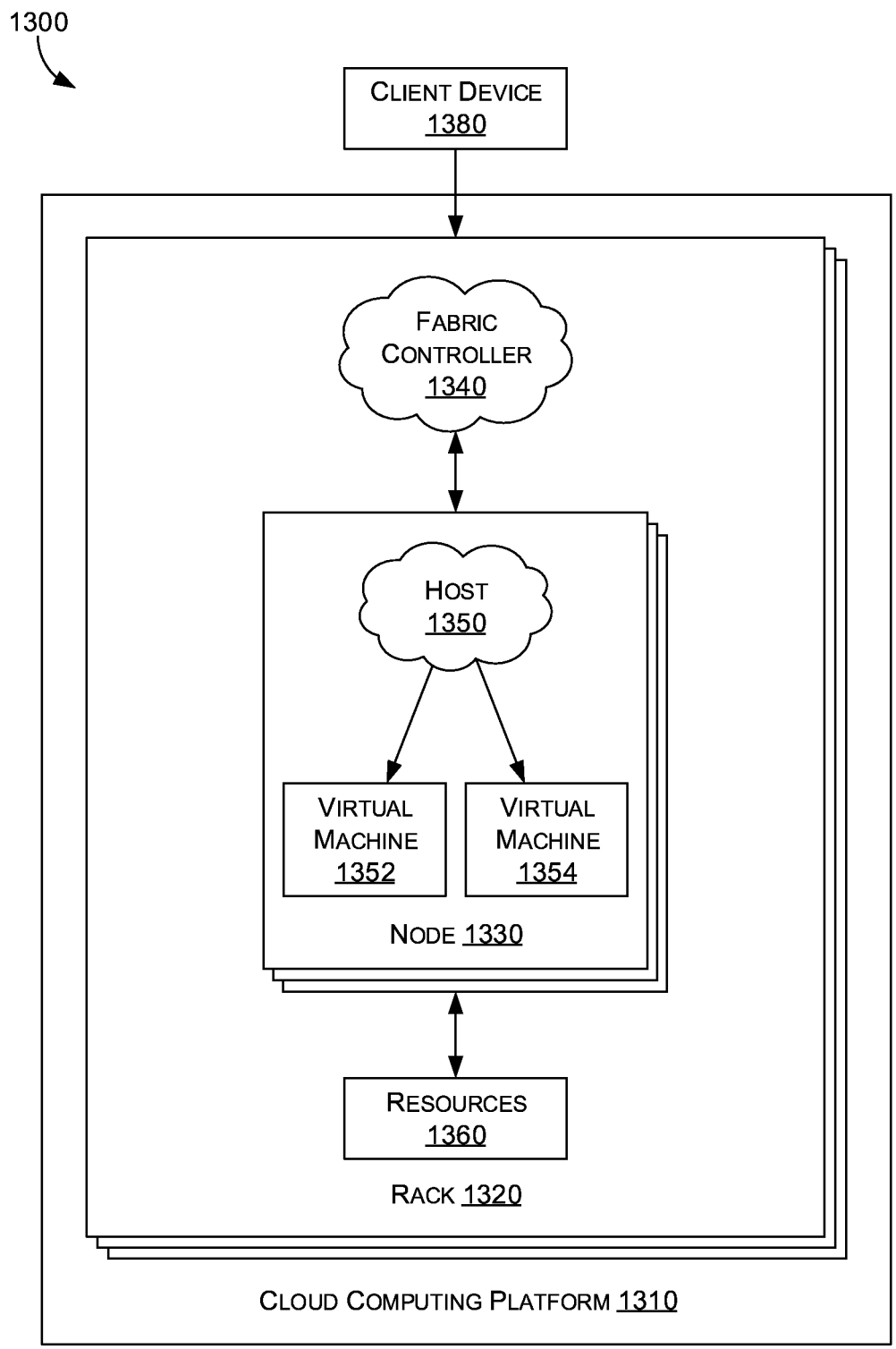
FIG. 13 provides a block diagram of an exemplary distributed computing environment suitable for use in implementing aspects of the technology described herein.

Referring now to FIG. 13, FIG. 13 illustrates an example distributed computing environment 1300 in which implementations of the present disclosure may be employed. In particular, FIG. 13 shows a high level architecture of an example cloud computing platform 1310 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 1300 that includes cloud computing platform 1310, rack 1320, and node 1330 (e.g., computing devices, processing units, or blades) in rack 1320. The technical solution environment can be implemented with cloud computing platform 1310 that runs cloud services across different data centers and geographic regions. Cloud computing platform 1310 can implement fabric controller 1340 component for provisioning and managing resource allocation, deployment, upgrade, and management of cloud services. Typically, cloud computing platform 1310 acts to store data or run service applications in a distributed manner. Cloud computing infrastructure 1310 in a data center can be configured to host and support operation of endpoints of a particular service application. Cloud computing infrastructure 1310 may be a public cloud, a private cloud, or a dedicated cloud.

Node 1330 can be provisioned with host 1350 (e.g., operating system or runtime environment) running a defined software stack on node 1330. Node 1330 can also be configured to perform specialized functionality (e.g., compute nodes or storage nodes) within cloud computing platform 1310. Node 1330 is allocated to run one or more portions of a service application of a tenant. A tenant can refer to a customer utilizing resources of cloud computing platform 1310. Service application components of cloud computing platform 1310 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1330, nodes 1330 may be partitioned into virtual machines (e.g., virtual machine 1352 and virtual machine 1354). Physical machines can also concurrently run separate service applications. The virtual machines or physical machines can be configured as individualized computing environments that are supported by resources 1360 (e.g., hardware resources and software resources) in cloud computing platform 1310. It is contemplated that resources can be configured for specific service applications. Further, each service application may be divided into functional portions such that each functional portion is able to run on a separate virtual machine. In cloud computing platform 1310, multiple servers may be used to run service applications and perform data storage operations in a cluster. In particular, the servers may perform data operations independently but exposed as a single device referred to as a cluster. Each server in the cluster can be implemented as a node.

Client device 1380 may be linked to a service application in cloud computing platform 1310. Client device 1380 may be any type of computing device, which may correspond to computing device 1300 described with reference to FIG. 13, for example, client device 1380 can be configured to issue commands to cloud computing platform 1310. In embodiments, client device 1380 may communicate with service applications through a virtual Internet Protocol (IP) and load balancer or other means that direct communication requests to designated endpoints in cloud computing platform 1310. The components of cloud computing platform 1313 may communicate with each other over a network (not shown), which may include, without limitation, one or more local area networks (LANs) and/or wide area networks (WANs).

Example Distributed Computing Environment

Having briefly described an overview of embodiments of the present invention, an example operating environment in which embodiments of the present invention may be implemented is described below in order to provide a general context for various aspects of the present invention. Referring initially to FIG. 13 in particular, an example operating environment for implementing embodiments of the present invention is shown and designated generally as computing device 1300. Computing device 1300 is but one example of a suitable computing environment and is not intended to suggest any limitation as to the scope of use or functionality of the invention. Neither should computing device 1400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 14:
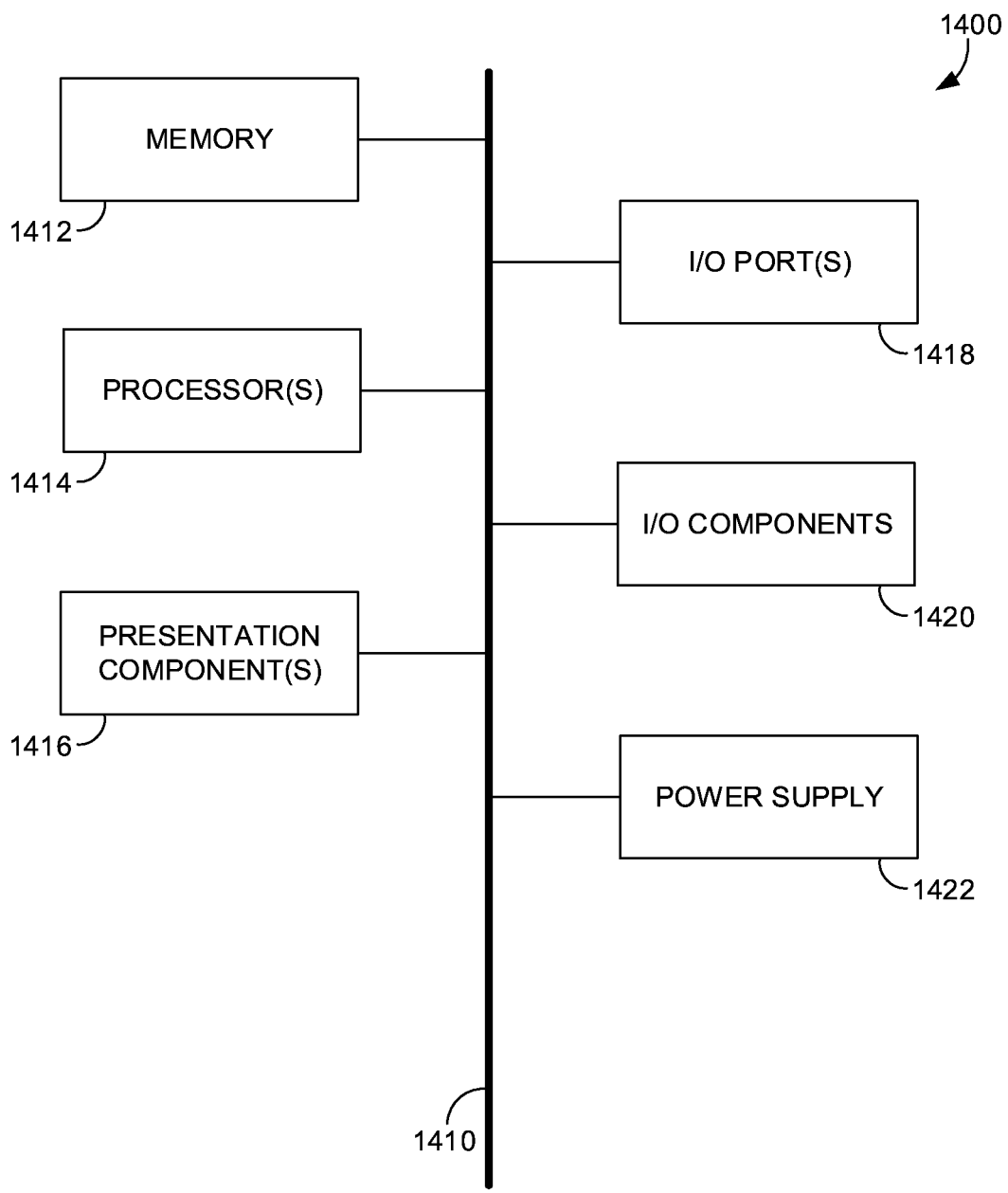
FIG. 14 is a block diagram of an exemplary computing environment suitable for use in implementing aspects of the technology described herein.

With reference to FIG. 14, computing device 1400 includes bus 1410 that directly or indirectly couples the following devices: memory 1412, one or more processors 1414, one or more presentation components 1416, input/output ports 1418, input/output components 1420, and illustrative power supply 1422. Bus 1410 represents what may be one or more buses (such as an address bus, data bus, or combination thereof). The various blocks of FIG. 14 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 14 is merely illustrative of an example computing device that can be used in connection with one or more embodiments of the present invention. Distinction is not made between such categories as "workstation," "server," "laptop," "hand-held device," etc., as all are contemplated within the scope of FIG. 14 and reference to "computing device."

Computing device 1400 typically includes a variety of computer-readable media. Computer-readable media can be any available media that can be accessed by computing device 1400 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1400. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1412 includes computer storage media in the form of volatile and/or nonvolatile memory. The memory may be removable, non-removable, or a combination thereof. Exemplary hardware devices include solid-state memory, hard drives, optical-disc drives, etc. Computing device 1400 includes one or more processors that read data from various entities such as memory 1412 or I/O components 1420. Presentation component(s) 1416 present data indications to a user or other device. Exemplary presentation components include a display device, speaker, printing component, vibrating component, etc.

I/O ports 1418 allow computing device 1400 to be logically coupled to other devices including I/O components 1420, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system, the computerized system comprising:
   at least one computer processor; and
   computer memory storing computer-useable instructions that, when used by the at least one computer processor, cause the at least one computer processor to perform operations comprising:
      accessing, at a meeting-video management engine, meeting-video content that corresponds to a meeting associated with a user;
      using a clip-generator machine learning model, generating a first clip and a second clip that define video data corresponding to the meeting-video content;
      accessing the video data, meeting data of the meeting, and user data of the user, wherein the video data, the meeting data, and the user data are associated with a meeting-video tailoring machine learning model that is trained based on meeting-video tailoring features, the meeting-video tailoring features correspond to the video data, the meeting data, and the user data and the meeting-video tailoring machine learning model is configured to generate a plurality of tailored meeting-video segments of the meeting-video content;
      based on the meeting-video content, the video data, the meeting data, and the user data, generating, via the meeting-video tailoring machine learning model, a first tailored meeting-video segment and a second tailored meeting-video segment;
      ranking the first tailored meeting-video segment and the second tailored meeting-video segment; and
      communicating the first tailored meeting-video segment and the second tailored meeting-video segment.

2. The computerized system of claim 1, wherein the first tailored meeting-video segment and the second tailored meeting-video segment are ranked based on an analytical hierarchy process in which weighted scores and weighted costs are computed for the meeting-video tailoring features.

3. The computerized system of claim 1, wherein communicating the first tailored meeting-video segment and the second tailored meeting-video segment causes presentation of the first tailored meeting-video segment and the second tailored meeting-video segment via a client device associated with the user.

4. The computerized system of claim 3, wherein communicating the first tailored meeting-video segment and the second tailored meeting-video segment comprises transmitting the first tailored meeting-video segment and the second tailored meeting-video segment for presentation in order based on the ranking.

5. The computerized system of claim 1, the meeting-video tailoring features include video data features, meeting data feature, user data feature, wherein the meeting-video tailoring features represent machine learning metrics relating meeting content, video content, and a user.

6. The computerized system of claim 1, wherein the meeting-video tailoring features comprise:
   video data features indicative of:
      audio features comprising an emotion score, a sound score, a pitch variation score, a silence score, or any combination thereof;
      speech features comprising question type score, talk section score, repeated content score, or any combination thereof; and
      video features comprising an identity of a speaker, an emotion of the speaker, a pitch variation of audio, or any combination thereof;
   user data features indicative of an identity of the user, user preferences, user feedback, a time zone of the user, a role associated with the user, or any combination thereof; and
   meeting data features indicative of a date of the meeting, the speaker, a planned time duration, and actual time duration, a sponsor, or any combination thereof.

7. The computerized system of claim 1, wherein the clip-generator machine learning model is trained based on meeting data features or video data features corresponding to the video data and is configured to generate the first clip and the second clip, wherein the first tailored meeting-video segment includes the first clip, the second clip, or both, wherein the meeting data features and the video data features correspond to clip-generator machine learning features.

8. The computerized system of claim 1, further comprising a data structure storing the meeting-video tailoring features used to train the meeting-video tailoring machine learning model, wherein the meeting-video tailoring features include a video data feature, a meeting data feature, and a user data feature each organized in a database as respective records, wherein the video data feature, the meeting data feature, and the user data feature include database entries corresponding to the video data, the meeting data, and the user data, respectively.

9. One or more computer-storage media having computer-executable instructions embodied thereon that, when executed by a computing system having a processor and memory, cause the processor to:

communicate, from a client device associated with a user, a request for meeting-video content corresponding to a conference associated with a first meeting and a second meeting;

based on communicating the request, receive a plurality of tailored meeting-video segments from a meeting-video management engine, the plurality of tailored meeting-video segments are generated based on (i) video data, (ii) meeting data associated with the first meeting and the second meeting, and (iii) user data of the user, wherein the video data, the meeting data, and the user data are associated with meeting-video tailoring features of a meeting-video tailoring machine learning model that is trained to generate the plurality of tailored meeting-video segments of the meeting-video content; and causing presentation, on the client device, of a meeting-video graphical user interface element of a meeting-video graphical user interface that controls playback of the plurality of tailored meeting-video segments of the meeting-video content.

10. The computer-storage media of claim 9, wherein the meeting-video graphical user interface comprises:

a first region configured to display the plurality of tailored meeting-video segments; and a second region comprising a second indication corresponding to (i) an entire video of the conference or (ii) an entire video of a meeting of the conference that, when selected, causes the playback of (i) the entire video of the conference or (ii) the entire video of the meeting, respectively, on the first region.

11. The computer-storage media of claim 10, wherein the playback of the plurality of tailored meeting-video segment or the entire video takes place on a third region of the graphical user interface.

12. The computer-storage media of claim 9, wherein the plurality of tailored meeting-video segments are ranked based on the meeting-video tailored features, and the presentation of the plurality of tailored meeting-video segments is based on the ranking.

13. The at least one computer-storage media of claim 12, wherein the meeting-video tailoring features comprise:

video data features indicative of:
  audio features comprising an emotion score, a sound score, a pitch variation score, a silence score, or any combination thereof;
  speech features comprising question type score, talk section score, repeated content score, or any combination thereof; and
  video features comprising an identity of a speaker, an emotion of the speaker, a pitch variation of audio, or any combination thereof;

user data features indicative of an identity of the user, user preferences, user feedback, a time zone of the user, a role associated with the user, or any combination thereof; and meeting data features indicative of a date of the meeting, a speaker, a planned time duration, and actual time duration, a sponsor, or any combination thereof.

14. The computer-storage media of claim 9, the meeting-video tailoring features include video data features, meeting data feature, user data feature, wherein the meeting-video tailoring features represent machine learning metrics relating meeting content, video content, and the user.

15. A computer-implemented method, comprising:

accessing, at a meeting-video management engine, meeting-video content associated with a meeting associated with a user;

accessing video data of the meeting-video content, meeting data of the meeting, and user data of the user, wherein the video data, the meeting data, and the user data are associated with meeting-video tailoring machine learning model that is trained based on meeting-video tailoring features, the meeting-video tailoring features correspond to the video data, the meeting data, and the user data, and the meeting-video tailoring machine learning model is configured to generate a plurality of tailored meeting-video segments of the meeting-video content;

based on the meeting-video content, the video data, the meeting data, and the user data, generating, via the meeting-video tailoring machine learning model, a first tailored meeting-video segment of the plurality of tailored meeting-video segments; and communicating the first tailored meeting-video segment to cause presentation of the first tailored meeting-video segment.

16. The computer-implemented method of claim 15, further comprising:

based on the meeting-video content, the video data, the meeting data, and the user data, causing the meeting-video tailoring machine learning model to generate a second tailored meeting-video segment;

ranking the first tailored meeting-video segment relative to the second tailored meeting-video segment; and communicating the second tailored meeting-video segment to cause the presentation of the second tailored meeting-video segment via a client device associated with the user.

17. The computer-implemented method of claim 16, wherein communicating the first tailored meeting-video segment and the second tailored meeting-video segment comprises transmitting the first second tailored meeting-video segment and the second tailored meeting-video segment for the presentation in order based on the ranking, wherein the first tailored meeting-video segment and the second tailored meeting-video segment are ranked based on an analytical hierarchy process in which weighted scores and weighted costs are computed for the meeting-video tailoring features.

18. The computer-implemented method of claim 15, wherein the video data is generated (i) using a clip-generator machine learning model to a first clip and a second clip that define the video data; and (ii) deriving video data from the first clip and the second clip.

19. The computer-implemented method of claim 15, wherein the video features comprise:

video data features indicative of:
  audio features comprising an emotion score, a sound score, a pitch variation score;
  speech features comprising question type score, talk section score, repeated content score, or any combination thereof; and
  video features comprising an identity of a speaker, an emotion of the speaker, a pitch variation of audio, people in a scene;

user data features indicative of an identity of the user, user preferences, user feedback, a time zone of the user, a role associated with the user, or any combination thereof; and meeting data features indicative of a date of meeting, a speaker, a planned time duration, and actual time duration, sponsors, or any combination thereof.

20. The computer-implemented method of claim 15, wherein the meeting-video tailoring features include video data features, meeting data feature, user data feature, wherein the meeting-video tailoring features represent machine learning metrics relating meeting content, video content, and a user.

* * * * *